United States Patent
Jung et al.

(10) Patent No.: US 8,350,946 B2
(45) Date of Patent: Jan. 8, 2013

(54) VIEWFINDER FOR SHARED IMAGE DEVICE

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 114 days.

(21) Appl. No.: 12/924,277

(22) Filed: Sep. 22, 2010

(65) Prior Publication Data
US 2011/0069196 A1    Mar. 24, 2011

Related U.S. Application Data

(63) Continuation of application No. 11/048,629, filed on Feb. 1, 2005, and a continuation of application No. 11/048,644, filed on Jan. 31, 2005, now abandoned.

(51) Int. Cl.
*H04N 5/222* (2006.01)
(52) U.S. Cl. .............. 348/333.02; 348/333.11
(58) Field of Classification Search .......... 348/211.1, 348/211.3, 211.8, 211.11, 211.13, 218.1, 348/333.01, 333.05, 211.99, 211.2, 211.4, 348/211.9, 211.12, 211.14, 333.02, 333.09, 348/333.11, 333.12
See application file for complete search history.

(56) References Cited

U.S. PATENT DOCUMENTS

| | | | |
|---|---|---|---|
| 4,124,871 A | 11/1978 | Morrin, II |
| 4,249,218 A | 2/1981 | Davis et al. |
| 4,747,143 A | 5/1988 | Kroeger et al. |
| 5,164,831 A | 11/1992 | Kuchta et al. |
| 5,341,192 A | 8/1994 | Wally, Jr. et al. |
| 5,388,197 A | 2/1995 | Rayner |
| 5,410,343 A | 4/1995 | Coddington et al. |
| 5,467,288 A | 11/1995 | Fasciano et al. |
| 5,477,546 A | 12/1995 | Shibata et al. |
| 5,546,145 A | 8/1996 | Bernardi et al. |
| 5,561,883 A | 10/1996 | Landry et al. |
| 5,588,029 A | 12/1996 | Maturi et al. |
| 5,612,715 A | 3/1997 | Karaki et al. |
| 5,629,778 A | 5/1997 | Reuman |
| 5,633,678 A | 5/1997 | Parulski et al. |

(Continued)

FOREIGN PATENT DOCUMENTS

JP       5064225       3/1993

(Continued)

OTHER PUBLICATIONS

CG.ITS.TUDELFT.NL, Delft University of Technology; "Shared cameras"; 1 page; located at http://www.cg.its.tudelft.nl/~spiff/descSC.html; printed on Mar. 21, 2011.

(Continued)

*Primary Examiner* — Nicholas Giles

(57) ABSTRACT

A technique includes receiving one or more captured shared image representations at a displaying shared image device from one or more shared image devices. At least one of the displaying shared image device and the one or more shared image devices configurable to capture one or more image representations. The technique further includes displaying a view-finder-based shared image representation over a viewfinder at the displaying shared image device.

9 Claims, 9 Drawing Sheets

U.S. PATENT DOCUMENTS

| | | | |
|---|---|---|---|
| 5,655,144 A | 8/1997 | Milne et al. |
| 5,659,662 A | 8/1997 | Wilcox et al. |
| 5,675,789 A | 10/1997 | Ishii et al. |
| 5,689,343 A | 11/1997 | Loce et al. |
| 5,689,442 A | 11/1997 | Swanson et al. |
| 5,701,163 A | 12/1997 | Richards et al. |
| 5,751,338 A | 5/1998 | Ludwig, Jr. |
| 5,764,800 A | 6/1998 | Yamagata |
| 5,796,879 A | 8/1998 | Wong et al. |
| 5,806,005 A | 9/1998 | Hull et al. |
| 5,822,440 A | 10/1998 | Oltman et al. |
| 5,825,506 A | 10/1998 | Bednar et al. |
| 5,845,166 A | 12/1998 | Fellegara et al. |
| 5,889,895 A | 3/1999 | Wong et al. |
| 5,892,509 A | 4/1999 | Jakobs et al. |
| 5,917,958 A | 6/1999 | Nunally et al. |
| 5,917,962 A | 6/1999 | Chen et al. |
| 5,926,605 A | 7/1999 | Ichimura |
| 5,956,081 A | 9/1999 | Katz et al. |
| 5,959,622 A | 9/1999 | Greer et al. |
| 5,995,095 A | 11/1999 | Ratakonda |
| 5,999,214 A * | 12/1999 | Inagaki .................... 348/211.12 |
| 6,028,585 A | 2/2000 | Ishii et al. |
| 6,034,786 A | 3/2000 | Kwon |
| 6,035,323 A | 3/2000 | Narayen et al. |
| 6,092,670 A | 7/2000 | Marriott |
| 6,115,341 A | 9/2000 | Hirai |
| 6,134,345 A | 10/2000 | Berman et al. |
| 6,157,406 A | 12/2000 | Iura et al. |
| 6,157,935 A | 12/2000 | Tran et al. |
| 6,167,350 A | 12/2000 | Hiramatsu et al. |
| 6,188,383 B1 | 2/2001 | Tamura |
| 6,188,431 B1 | 2/2001 | Oie |
| 6,198,526 B1 | 3/2001 | Ohtsuka |
| 6,204,877 B1 | 3/2001 | Kiyokawa |
| 6,226,672 B1 | 5/2001 | DeMartin et al. |
| 6,229,565 B1 | 5/2001 | Bobry |
| 6,285,794 B1 | 9/2001 | Georgiev et al. |
| 6,332,139 B1 | 12/2001 | Kaneko et al. |
| 6,332,666 B1 | 12/2001 | Ikeda |
| 6,333,792 B1 | 12/2001 | Kimura |
| 6,342,887 B1 | 1/2002 | Munroe |
| 6,356,868 B1 | 3/2002 | Yuschik et al. |
| 6,359,649 B1 | 3/2002 | Suzuki |
| 6,366,577 B1 | 4/2002 | Donovan |
| 6,380,972 B1 | 4/2002 | Suga et al. |
| 6,384,862 B1 | 5/2002 | Brusewitz et al. |
| 6,400,848 B1 | 6/2002 | Gallagher |
| 6,433,818 B1 | 8/2002 | Steinberg et al. |
| 6,446,095 B1 | 9/2002 | Mukai |
| 6,452,974 B1 | 9/2002 | Menon et al. |
| 6,456,339 B1 | 9/2002 | Surati et al. |
| 6,459,823 B2 | 10/2002 | Altunbasak et al. |
| 6,466,253 B1 | 10/2002 | Honjoh |
| 6,493,028 B1 | 12/2002 | Anderson et al. |
| 6,509,931 B1 | 1/2003 | Mizosoe et al. |
| 6,512,541 B2 | 1/2003 | Dunton et al. |
| 6,515,704 B1 | 2/2003 | Sato |
| 6,516,154 B1 | 2/2003 | Parulski et al. |
| 6,519,612 B1 | 2/2003 | Howard et al. |
| 6,522,418 B2 | 2/2003 | Yokomizo et al. |
| 6,535,228 B1 | 3/2003 | Bandaru et al. |
| 6,538,692 B2 | 3/2003 | Niwa |
| 6,539,169 B1 | 3/2003 | Tsubaki et al. |
| 6,542,183 B1 | 4/2003 | DeAngelis et al. |
| 6,546,189 B1 | 4/2003 | Koda |
| 6,567,122 B1 | 5/2003 | Anderson et al. |
| 6,573,927 B2 | 6/2003 | Parulski et al. |
| 6,577,311 B1 | 6/2003 | Crosby et al. |
| 6,577,336 B2 | 6/2003 | Safai |
| 6,583,813 B1 | 6/2003 | Enright et al. |
| 6,587,602 B2 | 7/2003 | Wakisawa et al. |
| 6,650,366 B2 | 11/2003 | Parulski et al. |
| 6,650,704 B1 | 11/2003 | Carlson et al. |
| 6,654,543 B2 | 11/2003 | Ando et al. |
| 6,657,667 B1 | 12/2003 | Anderson |
| 6,678,413 B1 | 1/2004 | Liang et al. |
| 6,687,877 B1 | 2/2004 | Sastry et al. |
| 6,698,021 B1 | 2/2004 | Amini et al. |
| 6,701,058 B1 | 3/2004 | Tsubaki |
| 6,701,845 B2 | 3/2004 | Ohmura |
| 6,710,809 B1 | 3/2004 | Niikawa |
| 6,728,729 B1 | 4/2004 | Jawa et al. |
| 6,735,253 B1 | 5/2004 | Chang et al. |
| 6,738,155 B1 | 5/2004 | Rosenlund et al. |
| 6,741,271 B1 | 5/2004 | McConica et al. |
| 6,750,902 B1 | 6/2004 | Steinberg et al. |
| 6,757,008 B1 | 6/2004 | Smith |
| 6,757,431 B2 | 6/2004 | Loce et al. |
| 6,762,791 B1 | 7/2004 | Schuetzle |
| 6,774,935 B1 | 8/2004 | Morimoto et al. |
| 6,775,406 B1 | 8/2004 | Watson |
| 6,801,719 B1 | 10/2004 | Szajewski et al. |
| 6,809,759 B1 | 10/2004 | Chiang |
| 6,813,312 B2 | 11/2004 | Tullberg et al. |
| 6,822,660 B2 | 11/2004 | Kim |
| 6,832,009 B1 | 12/2004 | Shezaf et al. |
| 6,864,911 B1 | 3/2005 | Zhang et al. |
| 6,871,010 B1 | 3/2005 | Taguchi et al. |
| 6,876,393 B1 | 4/2005 | Yokonuma |
| 6,885,395 B1 | 4/2005 | Rabbani et al. |
| 6,922,258 B2 | 7/2005 | Pineau |
| 6,930,707 B2 | 8/2005 | Bates et al. |
| 6,940,543 B2 | 9/2005 | Perotti et al. |
| 6,947,075 B1 | 9/2005 | Niikawa |
| 6,961,083 B2 | 11/2005 | Obrador et al. |
| 6,967,675 B1 | 11/2005 | Ito et al. |
| 6,978,311 B1 | 12/2005 | Netzer et al. |
| 6,992,711 B2 | 1/2006 | Kubo |
| 6,999,626 B2 | 2/2006 | Andrew |
| 7,015,954 B1 | 3/2006 | Foote et al. |
| 7,027,084 B1 | 4/2006 | Watanabe |
| 7,031,700 B1 | 4/2006 | Weaver et al. |
| 7,046,273 B2 | 5/2006 | Suzuki |
| 7,046,292 B2 | 5/2006 | Ziemkowski |
| 7,065,418 B2 | 6/2006 | Standard et al. |
| 7,068,316 B1 | 6/2006 | Pine |
| 7,075,567 B2 | 7/2006 | Hunter et al. |
| 7,079,176 B1 | 7/2006 | Freeman et al. |
| 7,084,910 B2 | 8/2006 | Amerson et al. |
| 7,110,025 B1 | 9/2006 | Loui et al. |
| 7,123,292 B1 | 10/2006 | Seeger et al. |
| 7,123,935 B2 | 10/2006 | Takahashi |
| 7,136,094 B2 | 11/2006 | Ziemkowski |
| 7,139,018 B2 | 11/2006 | Grosvenor et al. |
| 7,154,535 B2 | 12/2006 | Yamasaki et al. |
| 7,158,175 B2 | 1/2007 | Belz et al. |
| 7,161,619 B1 | 1/2007 | Niida et al. |
| 7,219,365 B2 | 5/2007 | Sato et al. |
| 7,221,863 B2 | 5/2007 | Kondo et al. |
| 7,227,569 B2 | 6/2007 | Maruya |
| 7,257,317 B2 | 8/2007 | Ohnishi |
| 7,327,385 B2 | 2/2008 | Yamaguchi |
| 7,340,766 B2 | 3/2008 | Nagao et al. |
| 7,362,968 B2 | 4/2008 | Kim |
| 7,366,979 B2 | 4/2008 | Spielberg et al. |
| 7,379,116 B2 | 5/2008 | Okamura |
| 7,411,623 B2 | 8/2008 | Shibutani |
| 7,417,667 B2 | 8/2008 | Shibutani |
| 7,448,063 B2 | 11/2008 | Freeman et al. |
| 7,460,781 B2 | 12/2008 | Kanai et al. |
| 7,463,216 B2 | 12/2008 | Yamazaki et al. |
| 7,474,338 B2 | 1/2009 | Sato |
| 7,477,296 B2 | 1/2009 | Okumura |
| 7,499,084 B2 | 3/2009 | Kurakata |
| 7,511,737 B2 | 3/2009 | Singh |
| 7,535,491 B1 | 5/2009 | Kumagai et al. |
| 7,542,183 B2 | 6/2009 | Satoh et al. |
| 7,602,419 B2 | 10/2009 | Kiuchi |
| 7,711,443 B1 | 5/2010 | Sanders et al. |
| 7,782,365 B2 | 8/2010 | Levien et al. |
| 7,840,892 B2 * | 11/2010 | Pyhalammi et al. .......... 715/230 |
| 2001/0028398 A1 | 10/2001 | Takahashi |
| 2001/0029521 A1 | 10/2001 | Matsuda et al. |
| 2001/0032335 A1 | 10/2001 | Jones |
| 2001/0033333 A1 | 10/2001 | Suzuki et al. |
| 2001/0042043 A1 | 11/2001 | Shear et al. |

| | | |
|---|---|---|
| 2001/0044858 A1 | 11/2001 | Rekimoto |
| 2001/0050875 A1 | 12/2001 | Kahn et al. |
| 2001/0052083 A1 | 12/2001 | Willins et al. |
| 2002/0006786 A1 | 1/2002 | Mine |
| 2002/0014954 A1 | 2/2002 | Fitzgibbon et al. |
| 2002/0018137 A1 | 2/2002 | Tsuda |
| 2002/0021359 A1 | 2/2002 | Okamoto |
| 2002/0030749 A1 | 3/2002 | Nakamura et al. |
| 2002/0054232 A1 | 5/2002 | Inagaki |
| 2002/0090217 A1 | 7/2002 | Limor et al. |
| 2002/0093575 A1 | 7/2002 | Kusaka |
| 2002/0103813 A1 | 8/2002 | Frigon |
| 2002/0118958 A1 | 8/2002 | Ishikawa et al. |
| 2002/0122194 A1 | 9/2002 | Kuwata et al. |
| 2002/0137529 A1 | 9/2002 | Takahashi |
| 2002/0149677 A1 | 10/2002 | Wright |
| 2002/0171737 A1 | 11/2002 | Tullis |
| 2002/0171747 A1 | 11/2002 | Niikawa et al. |
| 2002/0191079 A1 | 12/2002 | Kobayashi et al. |
| 2002/0196329 A1 | 12/2002 | Dudkowski |
| 2002/0196344 A1 | 12/2002 | McIntyre et al. |
| 2002/0197067 A1 | 12/2002 | Ohnishi |
| 2003/0007078 A1 | 1/2003 | Feldis, III |
| 2003/0016289 A1 | 1/2003 | Motomura |
| 2003/0018802 A1 | 1/2003 | Romanik et al. |
| 2003/0020814 A1 | 1/2003 | Ono |
| 2003/0021455 A1 | 1/2003 | Dixon et al. |
| 2003/0021591 A1 | 1/2003 | Grosvenor et al. |
| 2003/0030731 A1 | 2/2003 | Colby |
| 2003/0037111 A1 | 2/2003 | Yoshioka |
| 2003/0039380 A1 | 2/2003 | Sukegawa et al. |
| 2003/0063211 A1 | 4/2003 | Watanabe et al. |
| 2003/0069898 A1 | 4/2003 | Christodoulou et al. |
| 2003/0072491 A1 | 4/2003 | Sirivara et al. |
| 2003/0081140 A1 | 5/2003 | Furukawa |
| 2003/0090690 A1 | 5/2003 | Katayama et al. |
| 2003/0095191 A1 | 5/2003 | Saito |
| 2003/0103144 A1 | 6/2003 | Sesek et al. |
| 2003/0113014 A1 | 6/2003 | Katoh |
| 2003/0117642 A1 | 6/2003 | Haraguchi |
| 2003/0122940 A1 | 7/2003 | Myojo |
| 2003/0123078 A1 | 7/2003 | Kazami |
| 2003/0128272 A1 | 7/2003 | Clough et al. |
| 2003/0131002 A1 | 7/2003 | Gennetten et al. |
| 2003/0151679 A1 | 8/2003 | Amerson et al. |
| 2003/0152263 A1 | 8/2003 | Kawano et al. |
| 2003/0160870 A1 | 8/2003 | Ziemkowski |
| 2003/0222998 A1 | 12/2003 | Yamauchi et al. |
| 2003/0234953 A1 | 12/2003 | Dawson et al. |
| 2003/0236831 A1 | 12/2003 | Ortiz et al. |
| 2003/0236832 A1 | 12/2003 | McIntyre et al. |
| 2004/0001145 A1 | 1/2004 | Abbate |
| 2004/0008258 A1* | 1/2004 | Aas et al. ................ 348/207.1 |
| 2004/0012686 A1 | 1/2004 | Ono et al. |
| 2004/0017333 A1 | 1/2004 | Cooper et al. |
| 2004/0032517 A1 | 2/2004 | Walmsley et al. |
| 2004/0042679 A1 | 3/2004 | Yamada |
| 2004/0046885 A1 | 3/2004 | Regan et al. |
| 2004/0061782 A1 | 4/2004 | Kinjo |
| 2004/0062439 A1 | 4/2004 | Cahill et al. |
| 2004/0066968 A1 | 4/2004 | Glickman |
| 2004/0070586 A1 | 4/2004 | Taubin |
| 2004/0070678 A1 | 4/2004 | Toyama et al. |
| 2004/0075750 A1 | 4/2004 | Bateman |
| 2004/0080653 A1 | 4/2004 | Tanaka et al. |
| 2004/0080661 A1 | 4/2004 | Afsenius et al. |
| 2004/0090525 A1 | 5/2004 | Eichmann |
| 2004/0095480 A1 | 5/2004 | Battles et al. |
| 2004/0105015 A1 | 6/2004 | Tsukioka |
| 2004/0119841 A1 | 6/2004 | Shimizu |
| 2004/0120562 A1 | 6/2004 | Hays et al. |
| 2004/0123131 A1 | 6/2004 | Zacks et al. |
| 2004/0130634 A1 | 7/2004 | Delaney et al. |
| 2004/0131282 A1 | 7/2004 | Yoshida et al. |
| 2004/0141056 A1 | 7/2004 | Izumi et al. |
| 2004/0145501 A1 | 7/2004 | Hung |
| 2004/0150724 A1 | 8/2004 | Nozaki et al. |
| 2004/0160453 A1 | 8/2004 | Horton et al. |
| 2004/0172440 A1 | 9/2004 | Nakajima et al. |
| 2004/0174434 A1 | 9/2004 | Walker et al. |
| 2004/0174454 A1 | 9/2004 | Okamura |
| 2004/0183903 A1 | 9/2004 | Pedersen |
| 2004/0187583 A1 | 9/2004 | Ogawa |
| 2004/0196388 A1 | 10/2004 | Kaku |
| 2004/0201687 A1 | 10/2004 | Perotti et al. |
| 2004/0201690 A1 | 10/2004 | Bryant et al. |
| 2004/0201709 A1 | 10/2004 | McIntyre et al. |
| 2004/0221063 A1 | 11/2004 | Mogul |
| 2004/0233308 A1 | 11/2004 | Elliott et al. |
| 2004/0239958 A1 | 12/2004 | Nagata et al. |
| 2004/0252193 A1 | 12/2004 | Higgins |
| 2004/0252230 A1 | 12/2004 | Winder |
| 2004/0253990 A1 | 12/2004 | McCoog et al. |
| 2004/0257462 A1 | 12/2004 | Goris et al. |
| 2004/0263634 A1 | 12/2004 | Kiuchi |
| 2004/0263658 A1 | 12/2004 | Cozier et al. |
| 2005/0007471 A1 | 1/2005 | Walmsley et al. |
| 2005/0010407 A1 | 1/2005 | Jaroker |
| 2005/0013602 A1 | 1/2005 | Ogawa |
| 2005/0013604 A1 | 1/2005 | Ogawa |
| 2005/0018053 A1 | 1/2005 | Suga et al. |
| 2005/0028221 A1 | 2/2005 | Liu et al. |
| 2005/0036033 A1 | 2/2005 | Imai |
| 2005/0046707 A1 | 3/2005 | Takane |
| 2005/0050043 A1* | 3/2005 | Pyhalammi et al. ............... 707/6 |
| 2005/0052685 A1 | 3/2005 | Herf et al. |
| 2005/0057687 A1 | 3/2005 | Irani et al. |
| 2005/0058321 A1 | 3/2005 | Buehler |
| 2005/0080894 A1 | 4/2005 | Apostolopoulos et al. |
| 2005/0084113 A1 | 4/2005 | Simpson et al. |
| 2005/0093980 A1 | 5/2005 | Nonaka et al. |
| 2005/0103863 A1 | 5/2005 | Zhu et al. |
| 2005/0105806 A1* | 5/2005 | Nagaoka et al. ............... 382/224 |
| 2005/0113136 A1 | 5/2005 | Gosieski, Jr. |
| 2005/0130717 A1 | 6/2005 | Gosieski, Jr. et al. |
| 2005/0131905 A1 | 6/2005 | Margolus et al. |
| 2005/0132414 A1 | 6/2005 | Bentley et al. |
| 2005/0150362 A1 | 7/2005 | Uehara |
| 2005/0152619 A1 | 7/2005 | Motomura et al. |
| 2005/0158015 A1 | 7/2005 | Nakayama et al. |
| 2005/0187901 A1 | 8/2005 | Maritzen et al. |
| 2005/0195285 A1 | 9/2005 | Ide |
| 2005/0195291 A1 | 9/2005 | Kubo |
| 2005/0203930 A1 | 9/2005 | Bukowski et al. |
| 2005/0206721 A1 | 9/2005 | Bushmitch et al. |
| 2005/0212912 A1 | 9/2005 | Huster |
| 2005/0212950 A1 | 9/2005 | Kanai |
| 2005/0231625 A1 | 10/2005 | Parulski et al. |
| 2005/0262097 A1 | 11/2005 | Sim-Tang et al. |
| 2005/0278461 A1 | 12/2005 | Ohta |
| 2006/0010400 A1 | 1/2006 | Dehlin et al. |
| 2006/0028553 A1 | 2/2006 | Mori et al. |
| 2006/0044394 A1 | 3/2006 | Read |
| 2006/0044398 A1 | 3/2006 | Foong et al. |
| 2006/0044416 A1 | 3/2006 | Miyazaki et al. |
| 2006/0056056 A1 | 3/2006 | Ahiska et al. |
| 2006/0061451 A1 | 3/2006 | Chen |
| 2006/0083440 A1 | 4/2006 | Chen |
| 2006/0087559 A1 | 4/2006 | Huberman et al. |
| 2006/0087941 A1 | 4/2006 | Obradovich |
| 2006/0092291 A1 | 5/2006 | Bodie |
| 2006/0098112 A1 | 5/2006 | Kelly |
| 2006/0109349 A1 | 5/2006 | Takashima |
| 2006/0112413 A1 | 5/2006 | Ando et al. |
| 2006/0125922 A1 | 6/2006 | Albert et al. |
| 2006/0125928 A1 | 6/2006 | Wolcott et al. |
| 2006/0125937 A1 | 6/2006 | LeGall et al. |
| 2006/0126861 A1 | 6/2006 | Saliterman |
| 2006/0143665 A1 | 6/2006 | Meek et al. |
| 2006/0174203 A1 | 8/2006 | Jung et al. |
| 2006/0177132 A1 | 8/2006 | Jackson et al. |
| 2006/0192887 A1 | 8/2006 | Miyamaki et al. |
| 2006/0197839 A1 | 9/2006 | Senior et al. |
| 2006/0203099 A1 | 9/2006 | Omata |
| 2006/0268117 A1 | 11/2006 | Loui et al. |
| 2007/0195373 A1 | 8/2007 | Singh |
| 2007/0252901 A1 | 11/2007 | Yokonuma et al. |
| 2007/0274705 A1 | 11/2007 | Kashiwa et al. |

| | | | |
|---|---|---|---|
| 2008/0023232 A1 | 1/2008 | Morag et al. | |
| 2008/0192129 A1 | 8/2008 | Walker et al. | |
| 2009/0033752 A1 | 2/2009 | Bodnar et al. | |
| 2009/0281644 A1 | 11/2009 | Okamoto et al. | |
| 2009/0305677 A1 | 12/2009 | Ellison et al. | |

FOREIGN PATENT DOCUMENTS

| | | | |
|---|---|---|---|
| JP | H09-018762 | | 1/1997 |
| JP | 10023303 | A | 1/1998 |
| JP | 2001045452 | A | 2/2001 |
| JP | 2001086383 | | 3/2001 |
| JP | 2001-309236 | A | 11/2001 |
| JP | 2002-094862 | A | 3/2002 |
| JP | 2003-009044 | A | 1/2003 |
| JP | 2004274625 | A | 9/2004 |
| WO | WO 2005/112437 A1 | | 11/2005 |

OTHER PUBLICATIONS

Jain, Anil K.; "Fundamentals of Digital Image Processing"; 1989; pp. 1-569; Prentice-Hall, Inc.; Englewood Cliffs, NJ.

Adobe Photoshop User Guide 5.0;bearing a date of 1998; pp. 1,2,22,31-35,41,46,48,55-58,101,108,128,167-1-7,259-284, and 311-316; Adobe Systems Inc.

U.S. Appl. No. 12/806,060, Levien et al.
U.S. Appl. No. 12/799,398, Jung et al.
U.S. Appl. No. 12/799,367, Jung et al.
U.S. Appl. No. 12/290,538, Jung et al.
U.S. Appl. No. 12/284,202, Jung et al.
U.S. Appl. No. 12/283,420, Jung et al.
U.S. Appl. No. 11/213,324, Jung et al.
U.S. Appl. No. 11/210,284, Jung et al.
U.S. Appl. No. 11/190,516, Jung et al.
U.S. Appl. No. 11/173,166, Jung et al.
U.S. Appl. No. 11/153,868, Jung et al.
U.S. Appl. No. 11/143,970, Jung et al.
U.S. Appl. No. 11/129,045, Jung et al.
U.S. Appl. No. 11/122,274, Jung et al.
U.S. Appl. No. 11/115,078, Jung et al.
U.S. Appl. No. 11/089,530, Jung et al.
U.S. Appl. No. 11/069,909, Jung et al.
U.S. Appl. No. 11/064,787, Jung et al.
U.S. Appl. No. 11/048,644, Jung et al.

2TIFF.COM; "Introduction to 2TIFF"; located at http://www.2tiff.com/help/; bearing a date of 2004; printed on Feb. 16, 2005.

ABOUT.COM; "Image Size and Resolution"; pp. 1-3; located at http://graphicssoft.about.com/od/resolution/; bearing a date of 2005; printed on Feb. 16, 2005.

ADOBE.COM, "Share images with Photo Mail (Win only)", pp. 1-4, located at http://www.adobe.com/tips/phsel3photomail/main.html, printed on Jan. 26, 2005.

Bockaert, Vincent; "Interpolation"; pp. 1-4; located at http://www.dpreview.com/learn/?/Glossary/Digital_Imaging/Interpolation_01.htm; bearing a date of 1998-2005; printed on Feb. 16, 2005.

CANON.CA, "Print/Share Button", pp. 1-2, located at http://www.canon.ca/digitalphotography/english/ctech_article.asp?id=174&tid=6, bearing a date of Jan. 26, 2005, printed on Jan. 26, 2005.

CG.ITS.TUDELFT.NL, Delft University of Technology, "Shared cameras", pp. 1, located at http://www.cg.its.tudelft.nl/~spiff/descSC.html, printed on Jan. 27, 2005.

CHAINSTYLE.COM; "Resolution and Image Size"; pp. 1-9; located at http://www.chainstyle.com/photoshop/webhelp/tutorials/basics/resolution_and_image_size.htm; printed on Feb. 16, 2005.

Chastain, Sue; "Q. Is it better to use in-camera digital zoom or crop and resample with software?"; pp. 1-2; located at http://graphicssoft.about.com/cs/digitalimaging/f/digitalzoom.htm; bearing a date of 2005; printed on Feb. 16, 2005.

Cisco Systems, Inc.; "Cisco Catalyst 6500 Series Switches—High Availability for the Cisco Catalyst 6500 Series Switches"; pp. 1-9; located at http://www.cisco.com/en/US/products/hw/switches/ps708/products_white_paper09186a0080088874.shtml; bearing a date of 1992-2005; printed on May 3, 2005.

CO-ARRAY.ORG; "A Brief Overview of Co-Array Fortran"; pp. 1-3; located at http://www.co-array.org/caf_intro.htm; printed on May 3, 2005.

Dave; "How Many Pixels? A reasoned approach to digicam specifications"; pp. 1-5; located at http://www.imaging-resource.com/ARTS/HOWBIG/HOWBIG.HTM; bearing a date of 1999; printed on Feb. 16, 2005.

DEBIAN.ORG, "GNUstep application for digital still cameras", pp. 1-2, located at http://packages.debian.org/unstable/graphics/camera.app, bearing a date of Jan. 26, 2005, printed on Jan. 27, 2005.

Digital Photography Review, "Kodak EasyShare One", pp. 1-5, located at http://www.dpreview.com/news/0501/05010605kodakeasyshareone.asp, bearing a date of Jan. 6, 2005, printed on Jan. 26, 2005.

"Editing & Organizing Photos" Snapfish Website; bearing a date of: Jan. 20, 2005; located at: http://web.archive.org/web/20050405222248/www.snapfish.com/helpediting; pp. 1-8; printed on Apr. 22, 2010.

Ekdahl, Lars; "Image Size and resolution"; pp. 1-5; located at http://www.ekdahl.org/kurs/resolution/resolution2_eng.htm; bearing a date of 2002; printed on Feb. 16, 2005.

GEOCITIES.COM; "Which is better? Resample the image in a photo editor, print at a low resolution, use Genuine Fractals, or resample in many small steps?"; pp. 1-4; located at http://www.geocities.com/roberthaus/olytest/resample.html; printed on Feb. 16, 2005.

GIZMODO.COM; "FlashPoint ShareDrives"; pp. 1-2 located at http://www.gizmodo.com/gadgets/peripherals/storage/flashpoint-sharedrives-110083.php; bearing a date of Mon Jun. 27; printed on Jun. 29, 2005; Publised by Gawker Media.

Har-Peled, Sariel; Koltun, Vladlen; Song, Dezhen; Goldberg, Ken; CiteSeer.Ist:, "Efficient Algorithms for Shared Camera Control", pp. 1-2, located at http://citeseer.ist.psu.edu/har-peled02efficient.html, bearing a date of 2002, printed on Jan. 26, 2005.

Hewlett-Packard Development Company, L.P.; "Presenting the big picture."; pp. 1-7; located at http://www.matrixdisplay.com/pdf/HP_Big_Picture_Main_Brochure.pdf; bearing a date of 2003.

HOME.IPRIMUS.COM.AU; "Digital Cameras and Resampling"; pp. 1-2; located at http://home.iprimus.com.au/painless/resample.htm; printed on Feb. 16, 2005.

HP.COM, "HP Image Zone Express step-by-step: HP Instant Share", pp. 1-4, located at http://www.hp.com/united-states/ize/steps_instant_share.html, printed on Jan. 26, 2005.

Hua, Zhigang; Xie, Xing; Lu, Hanqing; Ma, Wei-Ying; Research.Microsoft.com, "COBO: Building Cooperative Environment for Cross-Device Image Sharing", pp. 1, located at http://research.microsoft.com/research/pubs/view.aspx?type=technical+report&id=823, bearing a date of Nov. 2004, printed on Jan. 25, 2005.

IMAGING RESOURCE.COM; "The Imaging Resource Quick Review"; pp. 1-22; located at http://www.imaging-resource.com/PRODS/1700/170A.HTM; bearing a date of 2001; printed on Feb. 16, 2005.

INTEL.COM, "Intel® PC Cameras", pp. 1-2, located at http://www.intel.com/pccamera/, printed on Jan. 27, 2005.

Jain, Anil K.; "Fundamentals of Digital Image Processing"; 1989; pp. 1-569; Prentice-Hall, Inc.; Englewood Cliffs, NJ U.S.A.

KODAK.COM, "Frequently Asked Questions", pp. 1, located at http://www.kodak.com/global/en/service/knowledgebase/digital-camera-faqs.jhtml?pq-path=1396/5759, bearing a date of Jan. 6, 2005, printed on Jan. 26, 2005.

Koren, Norman, "Understanding image sharpness: Digital cameras vs. film, part 2", pp. 1-16, located at http://www.normankoren.com/Tutorials/MTF7A.html, bearing a date of 2000-2004, printed on Feb. 4, 2005.

LTLIMAGERY.COM; "About Resolution Understanding Digital Image Resolution"; pp. 1-10; located at http://www.ltlimagery.com/resolution.html; bearing a date of 2000-2004; printed on Feb. 16, 2005.

Mahmoud, Qusay H.; "Getting Started with Data Synchronization Using SyncML"; located at http://developers.sun.com/techtopics/mobility/midp/articles/syncml/; bearing dates of Sep. 2004 and 1994-2005; printed on May 3, 2005.

MobileMan, "Nikon D2H WiFi Digital Camera", pp. 1-2, located at http://www.mobilemag.com/content/100/336/C2502/, bearing a date of Feb. 20, 2004, printed on Jan. 25, 2005.

MONEY.CNN.COM, "Playboy coming to iPod", pp. 1-2, located at http://money.cnn.com/2005/01/05/technology/personaltech/playboy_ipod/index.htm, bearing a date of Jan. 5, 2005, printed on Jan. 26, 2005.

National Instruments Corporation; "Advanced Analog Triggering and Synchronization Techniques"; pp. 1-2; located at http://zone.ni.com/devzone/conceptd.nsf/webmain/A387B5C0AC6F6F4E86256C87005FCDDF?opendocument&node=dz00000__us; bearing a date of 2005; printed on May 3, 2005.

National Instruments Corporation; "Genlocking Multiple JAI CV-MI Cameras"; pp. 1-5; located at http://zone.ni.com/devzone/conceptd.nsf/webmain/7a6b5853548850e886256c21005b1413; bearing a date of 2005; printed on May 3, 2005.

National Instruments Corporation; "Multi-Camera Acquisition"; pp. 1-3; locsated at http://zone.ni.com/devzone/conceptd.nsf/webmain/D91BAC1317F9D0A686256C9300769A0D; bearing a date of 2005; printed on May 3, 2005.

PHYSORG.COM; "World's First Built-In Wi-Fi-Enabled Digital Cameras"; pp. 1-3; located at http://www.physorg.com/news6183.html; bearing a date of Sep. 2, 2005; printed on Sep. 7, 2005.

Rains, Nick, "Vietnam Travel Photography the Digital Way", pp. 1-7, located at http://www.luminous-landscape.com/locations/vietnam.shtml, bearing a date of 2003, printed on Feb. 3, 2005.

RITZCAMERA.COM, "Canon—Powershot A85 Digital Camera", pp. 1-8, located at http://www.ritzcamera.com/webapp/wcs/stores/servlet/ProductDisplay?storeId=10001&catalogId=10001&langId=-1&productId=13176854, printed on Jan. 26, 2005.

ROADCASTING.ORG; "A new type of radio"; "Final Design"; "Process"; "Conclusions"; "Recognition"; "How Roadcasting Works"; "Download"; pp. 1-15; located at www.roadcasting.org; printed on Jun. 2, 2005.

Ross, Suzanne, Research.Microsoft.com, "The Life of a Digital Photo", pp. 1-5, located at http://research.microsoft.com/displayArticle.aspx?id=605, printed on Jan. 25, 2005.

Sciannamea, Michael, "WiFi-Enabled Digital Cameras About to Tap a Growing Marketplace", pp. 1-5, located at http://wifi.weblogsinc.com/entry/7312187118786387/, bearing a date of Oct. 12, 2004, printed on Jan. 25, 2004.

Seifert, Eric; Eligator, Ron; "Acoustical Design Considerations at Universal Studios CityWalk™, Orlando, Florida"; Acoustics at CityWalk; pp. 1-5; located at http://www.acousticdimensions.com/tech_CityWalk.htm; bearing dates of Apr. 23, 1999 and Apr. 24, 1999; printed on Jul. 20, 2005.

Sellen, Abigail; Fleck, Rowanne; Kindberg, Tim; Spasojevic, Mirjana; Research.Microsoft.com, "How and Why People Use Camera Phones", pp. 1-16, located at http://research.microsoft.com/research/pubs/view.aspx?type=technical+report&id=823 bearing a date of Nov. 2004, printed on Jan. 25, 2005.

"Snapfish Privacy Policy"; Snapfish Website; bearing a date of: Jan. 20, 2005; located at: http://web.archive.org/web/20050403221640/www.snapfish.com/privacy/t_=0; pp. 1-5; printed on Apr. 22, 2010.

SOUNDaround: Get cinema quality surround sound through two speakers; RAM: SOUNDaround by Xitel; pp. 1-7; located at http://www.ramelectronics.net/html/soundaround.html; printed on Jul. 20, 2005.

STARBURSTHOMEPAGE.COM; "Life is all about Sharing"; p. 1; located at http://www.starbursthomepage.com/flashpointx.htm; printed on Jun. 29, 2005.

STARBURSTHOMEPAGE.COM; "Sharing-On-The-Go Technology"; pp. 1-3; located at http://www.starbursthomepage.com/fsotg.htm; printed on Jun. 29, 2005.

STARBURSTHOMEPAGE.COM; "Specifications and Data Transfer Information"; pp. 1-5; located at http://www.starbursthomepage.com/fspec.htm; printed on Jun. 29, 2005.

STARBURSTHOMEPAGE.COM; "What are FlashPoint ShareDrives"; pp. 1-4; located at http://www.starbursthomepage.com/fproducts.htm; printed on Jun. 29, 2005.

Sutherland, Ed; "CSR Intros Low-Cost, Single-Chip WiFi", pp. 1-3, located at http://www.wi-fiplanet.com/news/article.php/3434131, bearing a date of Nov. 10, 2004, printed on Jan. 25, 2005.

SWGC.MUN.CA; "About image size and resolution"; pp. 1-6; located at http://www.swgc.mun.ca/vart2600/resolution.html; printed on Feb. 16, 2005.

"Yamaha Internet 'MidLive Vol. 3': An Open Experiment: The First MidLive to Feature Synchronized Streaming of MIDI and Audio Data"; Yamaha News Release: wMid Live vol. 3x; pp. 1-5; located at. http://www.yamaha.co.jp/english/news/97121101.html; bearing a date of Dec. 1997; printed on Jul. 19, 2005.

Grant, Andrew; "Open vs. Closed Source Software"; Science in Africa-Africa's First On-Line Science Magazine; bearing a date of Jan. 2004; Science in Africa, Science magazine for Africa, © 2002; pp. 1-4; located at http://www.scienceinafrica.co.za/2004/january/software.htm.

Palmer, James M.; "Radiometry and Photometry FAQ, Version 1.01"; bearing a date of Jun. 1999; pp. 1-14; located at: http://employeepages.scad.edu/~kwitte/documents/Photomety_FAQ.PDF.

Colbert, Martin; Voglimacci, Catherine; Finkelstein, Anthony; "Live, Audio-Visual Communication Systems for Distance Learning. Experience, Heuristics and ISDN"; bearing a date of 1995; pp. 1-40.

Cummins, Fred; "Synchronization Among Speakers Reduces Macroscopic Temporal Variability"; bearing a date of 2004; pp. 1-6.

Dodd, George; "Music Performance Venues—keeping them in tune with modern requirements"; bearing a date of 2009; pp. 1-11.

El Saddik, Abdulmotaleb Dr.; "Multimedia Communications: Multimedia Technologies & Applications"; Multimedia Communications Research Laboratory, School of Information Technology and Engineering, University of Ottawa, Ottawa, Ontario, Canada; 22 slides; created on Aug. 8, 2003; pp. 1-8.

Hernandez, J.R.; Perez-Gonzalez, F.; Rodriguez, J.M.; "Coding and Synchronization: A Boost and a Bottleneck for the Development of Image Watermarking"; bearing a date of 1998; pp. 1-7; Dept. Tecnologias de las Communicaciones, ETSI Telecom., Universidad de Vigo, 36200 Vigo, Spain.

Dodd, George; "Music Performance Venues-keeping them in tune with modern requirements"; bearing a date of 2009; pp. 1-11.

* cited by examiner

CLIENT/SERVER OR MASTER/SATELLITE CONFIGURATION

PEER-TO-PEER CONFIGURATION

CLIENT/SATELLITE SHARED IMAGE DEVICE CONFIGURATION

VIEWFINDER FOR SHARED IMAGE DEVICE

CROSS-REFERENCE TO RELATED APPLICATIONS

The present application is related to, claims the earliest available effective filing date(s) from (e.g., claims earliest available priority dates for other than provisional patent applications; claims benefits under 35 USC §119(e) for provisional patent applications), and incorporates by reference in its entirety all subject matter of the following listed application(s); the present application also claims the earliest available effective filing date(s) from, and also incorporates by reference in its entirety all subject matter of any and all parent, grandparent, great-grandparent, etc. applications of the following listed application(s):

For purposes of the USPTO extra-statutory requirements, the present application constitutes a continuation of U.S. patent application Ser. No. 11/048,629, entitled VIEWFINDER FOR SHARED IMAGE DEVICE, naming Edward K. Y. Jung, Royce A. Levien, Robert W. Lord, Mark A. Malamud, and John D. Rinaldo, Jr. as inventors, filed 1 Feb. 2005, which is currently co-pending, or is an application of which a currently co-pending application is entitled to the benefit of the filing date.

For purposes of the USPTO extra-statutory requirements, the present application constitutes a continuation of U.S. patent application Ser. No. 11/048,644 entitled SHARED IMAGE DEVICES, naming Edward K. Y. Jung; Royce A. Levien; Robert W. Lord; Mark A. Malamud and John D. Rinaldo, Jr. as inventors filed 31 Jan. 2005, now abandoned, or is an application of which a currently co-pending application is entitled to the benefit of the filing date.

TECHNICAL FIELD

The present application relates, in general, to sharing mechanisms that allow files such as images to be shared between multiple devices.

SUMMARY

In one aspect, a method includes but is not limited to: receiving one or more captured shared image representations at a displaying shared image device from one or more shared image devices, wherein at least one of the displaying shared image device and the one or more shared image devices configurable to capture one or more image representations; and displaying a view-finder-based shared image representation over a viewfinder at the displaying shared image device at least partially in response to the receiving one or more captured shared image representations at the displaying shared image device from the one or more shared image devices. In another aspect of the method, the displaying a view-finder-based shared image representation over a viewfinder at the displaying shared image device at least partially in response to the receiving one or more captured shared image representations at the displaying shared image device from the one or more shared image devices further includes but is not limited to: identifying over the viewfinder at least one shared image device that captured the view-finder-based shared image representation. In another aspect, the method further includes but is not limited to: transmitting feedback to the one or more shared image devices at least partially in response to the receiving one or more captured shared image representations at the displaying shared image device from the one or more shared image devices. In another aspect, the method further includes but is not limited to: transmitting feedback to the one or more shared image devices at least partially in response to the displaying the view-finder-based shared image representation over the viewfinder at the displaying shared image device. In another aspect of the method, the displaying a view-finder-based shared image representation over a viewfinder at the displaying shared image device at least partially in response to the receiving one or more captured shared image representations at the displaying shared image device from the one or more shared image devices includes but is not limited to: presenting the one or more captured shared image representations at least partially in response to the receiving one or more captured shared image representations at the displaying shared image device from the one or more shared image devices. In another aspect, the method further includes but is not limited to: transmitting the view-finder-based shared image representation to the one or more shared image devices. In another aspect of the method, the displaying a view-finder-based shared image representation over a viewfinder at the displaying shared image device at least partially in response to the receiving one or more captured shared image representations at the displaying shared image device from the one or more shared image devices includes but is not limited to: displaying an indication of a number of categories of the one or more captured shared image representations that has been captured by the one or more shared image devices. In another aspect, the method further includes but is not limited to: requesting a differently resolved version of a one or more captured shared image representations at least partially in response to the displaying an indication of a number of categories of the one or more captured shared image representations that has been captured by the one or more shared image devices. In another aspect of the method, the displaying a view-finder-based shared image representation over a viewfinder at the displaying shared image device at least partially in response to the receiving one or more captured shared image representations at the displaying shared image device from the one or more shared image devices includes but is not limited to: displaying an indication of a physical capturing location of the captured shared image representations at least partially in response to the receiving one or more captured shared image representations at the displaying shared image device from the one or more shared image devices. In another aspect of the method, the displaying a view-finder-based shared image representation over a viewfinder at the displaying shared image device at least partially in response to the receiving one or more captured shared image representations at the displaying shared image device from the one or more shared image devices includes but is not limited to: displaying an identity of a user of a shared image device at least partially in response to the receiving one or more captured shared image representations at the displaying shared image device from the one or more shared image devices. In another aspect of the method, the displaying a view-finder-based shared image representation over a viewfinder at the displaying shared image device at least partially in response to the receiving one or more captured shared image representations at the displaying shared image device from the one or more shared image devices includes but is not limited to: displaying an identity of a subject at least partially in response to the receiving one or more captured shared image representations at the displaying shared image device from the one or more shared image devices. In another aspect of the method, the displaying a view-finder-based shared image representation over a viewfinder at the displaying shared image device at least partially in response to the receiving one or more captured shared image representations at the displaying shared image device from the one or more shared image devices includes but is not limited to: displaying a percentage of a memory storage that is filled in the at least one displaying shared image device. In another aspect of the method, the displaying a view-finder-based shared image representation over a viewfinder at the displaying shared image device at least partially in response to the receiving one or more captured shared image representations at the displaying shared image device from the one or more shared image devices includes but is not limited to: displaying a percentage of a memory storage that is filled by the one or more captured shared image representations pertaining at least in part to a particular session at least partially in response to the receiving one or more captured shared image representations at the displaying shared image device from the one or more shared image devices. In another aspect of the method, the displaying a view-finder-based shared image representation over a viewfinder at the displaying shared image device at least partially in response to the receiving one or more captured shared image representations at the displaying shared image device from the one or more shared image devices includes but is not limited to: receiving the one or more captured shared image representations at the displaying shared image device by the one or more shared image devices. In one aspect, the method further includes but is not limited to: selecting which of the one or more captured shared image representations to display over the viewfinder at the displaying shared image device. In another aspect, the method further includes but is not limited to: transmitting a request to at least one shared image device to provide an alternate shared image representation version of the view-finder-based shared image representation. In another aspect, the method further includes but is not limited to: subscribing to the receiving of the one or more captured shared image representations prior to the receiving one or more captured shared image representations at the displaying shared image device. In one aspect, the method further includes but is not limited to: subscribing to the receiving of the one or more captured shared image representations following the receiving one or more captured shared image representations at the displaying shared image device. In one aspect, the method further includes but is not limited to: displaying those geographic areas that have been imaged by an at least one view-finder-based shared image representation during a session at least partially in response to the receiving one or more captured shared image representations at the displaying shared image device from the one or more shared image devices. In one aspect, the method further includes but is not limited to: obtaining at least one of the captured shared image representations at the displaying shared image device over a wireless link. In one aspect, the method further includes but is not limited to: obtaining at least one of the captured shared image representations at the displaying shared image device over a camera flash link. In another aspect of the method, the displaying a view-finder-based shared image representation over a viewfinder at the displaying shared image device at least partially in response to the receiving one or more captured shared image representations at the displaying shared image device from the one or more shared image devices includes but is not limited to: displaying at least one current captured shared image representation at least partially in response to the receiving one or more captured shared image representations at the displaying shared image device from the one or more shared image devices. In another aspect of the method, the displaying a view-finder-based shared image representation over a viewfinder at the displaying shared image device at least partially in response to the receiving one or more captured shared image representations at the displaying shared image device from the one or more shared image devices includes but is not limited to: displaying at least one historical captured shared image representation at least partially in response to the receiving one or more captured shared image representations at the displaying shared image device from the one or more shared image devices. In another aspect of the method, the displaying a view-finder-based shared image representation over a viewfinder at the displaying shared image device at least partially in response to the receiving one or more captured shared image representations at the displaying shared image device from the one or more shared image devices includes but is not limited to: displaying at least one real-time capture view-finder-based shared image representation and displaying at least one prior view-finder-based shared image representation, and further including combining the real-time capture view-finder-based shared image representation and the prior view-finder-based shared image representation to provide a combined view-finder-based shared image representation that is displayed over the viewfinder at the displaying shared image device. In another aspect of the method, the displaying at least one real-time capture view-finder-based shared image representation and displaying at least one prior view-finder-based shared image representation, and further including combining the real-time capture view-finder-based shared image representation and the prior view-finder-based shared image representation to provide a combined view-finder-based shared image representation that is displayed over the viewfinder at the displaying shared image device includes but is not limited to: displaying the at least one real-time capture view-finder-based shared image representation within the at least one prior view-finder-based shared image representation over the viewfinder at the displaying shared image device. In another aspect of the method, the displaying at least one real-time capture view-finder-based shared image representation and displaying at least one prior view-finder-based shared image representation, and further including combining the real-time capture view-finder-based shared image representation and the prior view-finder-based shared image representation to provide a combined view-finder-based shared image representation that is displayed over the viewfinder at the displaying shared image device includes but is not limited to: displaying the at least one prior view-finder-based shared image representation within the at least one real-time capture view-finder-based shared image representation over the viewfinder at the displaying shared image device. In addition to the foregoing, other method aspects are described in the claims, drawings, and text forming a part of the present application.

In one aspect, an apparatus includes but is not limited to: a displaying shared image device configurable to receive one or more captured shared images that have been captured by one or more shared image devices, the one or more shared image devices are each configurable to capture the one or more captured shared images; and the displaying shared image device configurable to display a view-finder-based shared image over a viewfinder at the displaying shared image device at least partially responsive to the displaying shared image device configurable to receive the one or more captured shared image. In one aspect of the apparatus, the displaying shared image device configurable to receive one or more captured shared images that have been captured by one or more shared image devices, the one or more shared image devices are each configurable to capture the one or more captured shared images includes but is not limited to: an intermediate shared image device operationally coupled between the one or more shared image devices and the displaying shared image device, the intermediate shared image device configurable to store and forward the one or more captured shared images. In one aspect of the apparatus, the displaying shared image device configurable to display a view-finder-based shared image over a viewfinder at the displaying shared image device at least partially responsive to the displaying shared image device configurable to receive the one or more captured shared image includes but is not limited to: the displaying shared image device configurable to display the view-finder-based shared image on a substantially real-time basis. In one aspect of the apparatus, the displaying shared image device includes but is not limited to: a liquid crystal display (LCD). In one aspect of the apparatus, the displaying shared image device includes but is not limited to: an optical viewfinder. In one aspect, the apparatus includes but is not limited to: a communication link receiver configurable to transfer data to be used at least in part to operationally couple the displaying shared image device to receive the one or more captured shared images that have been captured by the one or more shared image devices. In one aspect, the apparatus includes but is not limited to: a communication link transmitter configurable to at least partially transmit one or more another shared images from the displaying shared image device at least partially responsive to the displaying shared image device configurable to display the view-finder-based shared image over the viewfinder. In one aspect of the apparatus, the displaying shared image device includes but is not limited to: one or more of a still-picture camera, a camcorder, a laptop computer, a desktop computer, a portable image store and display device, a personal display assistant (PDA), a printer, or a compact disk (CD) drive. In addition to the foregoing, other apparatus aspects are described in the claims, drawings, and text forming a part of the present application.

In one aspect, a system includes but is not limited to: one or more capturing shared image devices configurable to capture at least one image representation; the one or more capturing shared image devices configurable to transmit the at least one image representation that has been captured to a displaying shared image device to effect sharing of the at least one image representation with the displaying shared image device; the displaying shared image device configurable to receive the at least one image representation configurable to transmit from the one or more capturing shared image device; and a viewfinder of the displaying shared image device configurable to display the at least one image representation that has been received by the displaying shared image device from the one or more capturing shared image device. In addition to the foregoing, other system aspects are described in the claims, drawings, and text forming a part of the present application In another aspect, a method includes but is not limited to: receiving one or more captured shared images at an at least one displaying shared image device, the one or more captured shared images have been captured by one or more shared image devices; and displaying at least one view-finder-based shared image over a viewfinder at the at least one displaying shared image device at least partially in response to said receiving the one or more captured shared images at the at least one displaying shared image device. In one aspect of the method, the displaying at least one view-finder-based shared image over a viewfinder at the at least one displaying shared image device includes but is not limited to: displaying at least two view-finder-based shared images over the viewfinder, wherein the at least two view-finder-based shared images originate from separate shared image devices. In one aspect of the method, the displaying at least one view-finder-based shared image over a viewfinder at the at least one displaying shared image device includes but is not limited to: displaying a reduced resolution version of the at least one image representation over the viewfinder at the at least one displaying shared image device. In one aspect of the method, the displaying at least one view-finder-based shared image over a viewfinder at the at least one displaying shared image device includes but is not limited to: displaying metadata over the viewfinder. In one aspect of the method, the displaying at least two view-finder-based shared images over the viewfinder, wherein the at least two view-finder-based shared images originate from separate shared image devices includes but is not limited to: indicating over the viewfinder at the at least one displaying shared image device the one of the at least one capturing shared image device that has captured the respective one or more captured shared images. In another aspect, the method further includes but is not limited to requesting over the viewfinder at the at least one displaying shared image device at least one different version of the at least one view-finder-based shared image to receive from the one of the plurality of shared image devices to the at least one displaying shared image device. In addition to the foregoing, other method aspects are described in the claims, drawings, and text forming a part of the present application.

In another aspect, a method includes but is not limited to: displaying over a viewfinder of a first image device at least one image, or a portion thereof, that is at least partially being captured at a second image device. In one aspect of the method, the displaying over a viewfinder of a first image device at least one image, or a portion thereof, that is at least partially being captured at a second image device includes but is not limited to: displaying over a viewfinder of a first image device the at least one image, or a portion thereof at the first image device as it could appear on an another viewfinder at the second image device. In one aspect, the method further includes but is not limited to: sharing the at least one image, or a portion thereof, that is at least partially being captured at the second image device with the first image device. In another aspect of the method, the displaying over a viewfinder of a first image device at least one image, or a portion thereof, that is at least partially being captured at a second image device further includes but is not limited to: displaying an at least one substantial real-time view-finder image and an at least one prior captured view-finder image as a combined view-finder image over the viewfinder of the first image device. In addition to the foregoing, other method aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, features, and advantages of the devices and/or processes and/or other subject matter described herein will become apparent in the text set forth herein.

DETAILED DESCRIPTION

Figure 1:
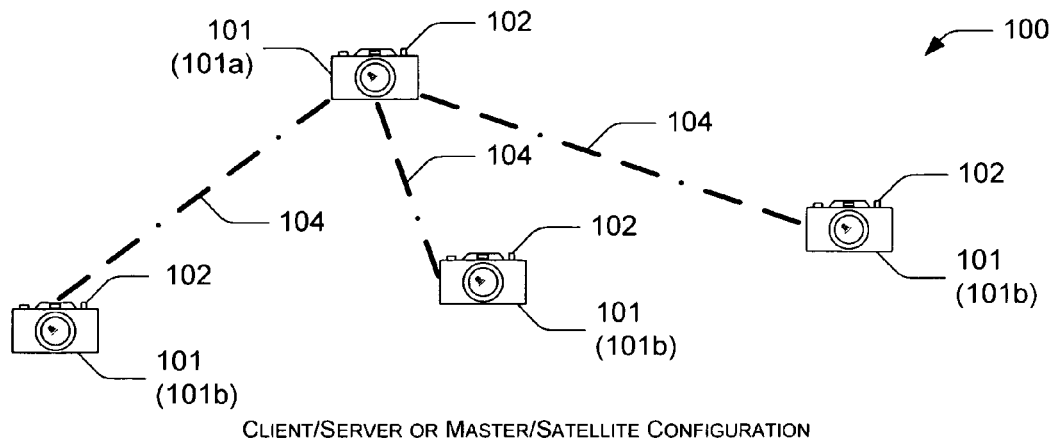
FIG. 1 shows a schematic diagram of one embodiment of a shared image network including a plurality of shared image devices, the plurality of shared image devices including a sharing mechanism.

This disclosure describes a number of embodiments of sharing mechanisms that can each be integrated in, and/or utilized by, at least one shared image device 101. Certain embodiments of the shared image devices can capture an image (e.g., take a photograph), and the present disclosure provides a number of these sharing mechanisms by which shared images can be shared or copied, and transferred either to other capturing shared image devices and/or other non-capturing shared image devices. In this disclosure, the term "capture" can apply to either imaging, photography, or otherwise producing shared images, or portions thereof. Different embodiments of the shared image devices 101 can each perform one or more processes including, but not limited to: capturing, creating, processing, storing, printing, transferring, obtaining, retaining, displaying, or receiving the shared images. Different embodiments of the shared images can be configured as still images and/or motion images (e.g., moving pictures). This disclosure describes many embodiments of the sharing mechanism 102 that can be integrated in one or more shared image device 101.

Within the disclosure, those shared image devices 101, such as digital cameras, camcorders, etc., that can capture shared image information may be considered as capturing shared image devices that are distinct from those shared image devices 101 that cannot capture shared image information. Capturing shared images using digital cameras or camcorders can be each equated with photography as performed by traditional film cameras. Those shared image devices that cannot capture images may be referred to as "peripheral shared image devices" since they perform such peripheral actions as storing, saving, store and forwarding, displaying, and otherwise processing on images.

Within the disclosure, the terms "shared images", "images", or "image information" can pertain to full images, portions of images, segments of full images, thumbnails of images, information that describes particular images such as metadata (that can contain such information as the subject of the image, identifying who took the image, where the image was taken, the reference number of the image, etc.). Within this disclosure, the terms "image representation" or "image" pertain to images, thumbnails of images, icons that pertain to images, portions of images, images having altered resolution, information pertaining to images such as metadata, etc. The term "obtain" applies to obtaining shared images either by capturing or by data transfer from another shared image device. The term "retain" applies to storing shared images for some duration regardless how temporary or permanent the storage.

Certain embodiments of still images can include photographs or digital images that can be captured by a shared image device such as, for example, a digital camera. Certain embodiments of motion images can include videos that may be captured by a shared image device such as, for example, a camcorder. Digital cameras and/or camcorders can thereby integrate a sharing mechanism to capture, obtain, store, or transfer such shared images. A variety of embodiments of the sharing mechanism can therefore handle such exemplary shared images as digital still images or digital motion images that are either alone or in combination with video, audio, music, etc.

Examples of shared image devices 101 that may not be configured or able to capture shared image information include certain laptop computers, desktop computers, portable image store and display devices, personal display assistants (PDAs), printers, compact disk (CD) drives, etc. Certain embodiments of portable image store and display devices can be configured to utilize peer-to-peer communications, and may be capable of transferring shared images there between. Certain embodiments of the shared image devices that cannot capture shared image information operate largely to retain, obtain, store, process, and/or display shared images.

In different embodiments, the shared mechanism can be configured to provide a largely automated publishing function between multiple shared image devices. Certain shared image(s) that are captured by a shared image device can be distributed to, and/or received by, other shared image devices, and thereby be "published" and made public (and therefore can be considered to be no longer private). One embodiment of the sharing-mechanism 102 allows the shared image device 101 to toggle on/off publishing of the shared images to switch between the images being made public and private. In certain embodiments, such publishing can be set to automatically extend for a prescribed duration as defined as a "sharing session", after which duration the shared image devices each returns to their non-sharing configuration. In other embodiments, the sharing session can be permanent or have a lengthy duration.

Certain embodiments of the shared image device 101 that include at least a portion of the sharing mechanism 102 can be modified to therefore provide a variety of functions. Many embodiments of shared image devices that can capture shared images, such as cameras or camcorders, can also function as storage devices to store some data pertaining to shared images; and those capturing embodiments of shared image devices can also act as a memory acquisition device that obtains or retains pictures from other shared image devices. Other embodiments of the shared image device 101 such as portable image storage and display devices can be configured as storage devices, in which shared images can be stored, accessed, and/or displayed.

The very nature of such capturing shared image devices as cameras, digital cameras, or camcorders is likely to change radically as technology improves. For example, it is likely that digital cameras or camcorders will develop greater memory as technology improves. As such, multiple such capturing shared image devices could be "networked" in such a manner that a large number of images can be transferred between multiple capturing shared image devices. Certain capturing shared image devices can be optimized for their data storage or processing capabilities, and as such these may behave somewhat like computer servers. Other capturing shared image devices can be optimized for their photographic or zooming abilities, and as such these can be considered as true capturing devices. As the characteristics and abilities of different shared image devices vary more, the benefits of networking the shared image devices increases as well. Certain sharing concepts, as described herein, enhance the networking aspects of the capturing shared image devices.

In this disclosure, "subscribing" is considered to be a user deciding to join their shared image device in a session to provide and/or receive shared images. In certain embodiments of the shared image device, it may be desired to subscribe to different functions using different mechanisms. While any two particular functions may be described with respect to this disclosure, it is to be understood that this disclosure is intended to describe other shared image devices that can perform varied or alternative functions.

In certain embodiments of shared image devices, a mechanism is provided by which the shared image device may not share every image that it is capturing as shared images during a particular sharing session. Certain embodiments of each shared image device 101 can provide such operations as, but is not limited to, configuring shared image devices to perform active sharing between multiple shared image devices, temporarily pausing or muting the active sharing, resuming the active sharing after temporary pausing or muting, connecting with other devices and/or people, or performing a variety of operations. Such temporary pausing or muting may be equated to temporarily stopping a subscription, and in many embodiments the shared images that were shared during this pausing or muting period can be transmitted or collected after the pausing or muting. Other aspects and concerns of sharing the shared images can relate to managing the shared image devices. Such tasks may have been performed in conventional networks by a network administrator. Examples of these tasks include controlling and selecting image resolution, allowing shared images to exit a particular shared image device but not enter the same shared image device, or vice versa.

Certain embodiments of shared image devices 101 can each include a portion of a share mechanism 102, such as a share button, that the owner of the shared image device 101 can actuate by such action as physically pressing. An actuating portion of a sharing mechanism can act to join a number of shared image devices during a particular sharing session, and/or possibly perform some other function(s) relative to the sharing session. Actuating portions of such share mechanisms 102 can be conveniently located on some external casing of a digital camera or camcorder, or some other such location for easy actuation. Certain embodiments of share mechanisms can include those components and/or processes that allow one shared image device to share and/or copy images with at least one other shared image device during a particular sharing session.

In an alternate embodiment, a share mechanism 102 can be integrated in a portion of a computer/controller based program to control the sharing process between multiple shared image devices. As such, certain share mechanisms can be segmented between a plurality of shared image devices, since it often takes more than one shared image device to share an image. Such a share mechanism can include an actuating portion that can actuate the sharing for each shared image device, a graphical user interface (GUI) or computer display that can display copies of the shared images to the users across multiple shared image devices, and an authentication or authorization portion that can provide authentication or authorization between multiple shared image devices.

A number of other embodiments of the actuating portion of the sharing mechanism can differ considerably from a manually-actuated shared mechanism, such as a share button. Such shared image devices can rely on proximity between shared image devices. For example, certain embodiments of the sharing mechanism 102 can utilize near-field shared image devices that are within a prescribed range that can be automatically actuated to copy and/or share the shared image information. In certain embodiments, the actuating portion of the share mechanism can even be remotely positioned from the associated shared image device 101, such as in a remote-control of the type that is in common usage for television, etc.

In another embodiment, a plurality of shared image devices 101 can be actuated by physically touching multiple shared image devices together. A Java ring (as produced and made commercially available by Dallas Semiconductor) provides an example of a commercially available actuating mechanism that can be used to transmit data between numerous devices resulting from physical contact of those devices. A Java ring or other similar device could be utilized by an embodiment of a sharing mechanism to substantially automatically actuate sharing images between multiple shared image devices 101. In certain embodiments, the actuating portion of the share mechanism can even be remotely positioned from the associated shared image device 101, such as in a remote-control of the type that is in common usage for television, etc.

Examples of Shared Image Devices Relying on Proximity

In certain embodiments, various users can thereby transfer video, images, or some other type of information based on the proximity of shared image devices 101. A variety of embodiments of the shared image device 101 can thereby rely on proximity for their sharing. The embodiment of the proximity vary and can include, but are not limited to, geographic proximity, proximity utilizing a communication link, and proximity utilizing passwords, pass-phrases, patterns on paper, and the like.

In many embodiments, the term "proximity" indicates that shared image devices 101 are sufficiently geographically closely located to be operationally coupled to each other, such as to establish a communication link 104. In certain embodiments, the geographic proximity can be provided over a wireless link that provides data transfer that can include transfer of the shared images or portions thereof.

In one embodiment, the shared image devices 101 can be operationally coupled within the shared image network 100 using a series of communication links 104. In this disclosure, the communication link 104 can be intended to include, but is not limited to: a wireless link, an 802.11-based link, an infrared data transfer link, a wired-based link, a physical-contact sharing mechanism that can transmit data upon physical contact, or any other type of link that allows for sufficient data to be transmitted between pairs of shared image devices 101.

Certain embodiments of the wireless communication link, as described herein, can utilize a variety of electromagnetic radiation to transmit data. The electromagnetic radiation that provides one embodiment of the wireless communication link 104 can include, but is not limited to, infrared, ultraviolet, near infrared, and/or optical signals. There are a variety of embodiments of optical communication links 104 that are within the intended scope of the present disclosure. In one embodiment, a devoted optical communication link can be provided such that data corresponding to the images can be transmitted between respective shared image devices. The communication link 104 can be configured, in one embodiment, by operationally coupling a transmitting portion to one shared image device, and a receiving portion to another shared image device. Alternately, a transceiver portion can be attached to each respective shared image device to provide an effective two-way communication link. The transmitter, receiver, and/or transceiver portions of the communication link are to be configured to carry sufficient data over the communication link considering the task at hand.

In another embodiment, a camera flash can be utilized as a communication link. The intensity of the camera flash can be modulated between different levels (including, but not limited to, turning on and off) to contain a variety of shared image information. Such directing of the optical flash in a suitable direction should be considered, such that reflected light does not interfere with the modulated incident light produced by the camera flash. Such modulating can be used to effectively transmit data information pertaining to the image information.

One advantage of using certain embodiments of the camera flash or other such wireless link is that multiple receiving shared image devices can simultaneously obtain shared images from a single transmitting shared image device (e.g., by the multiple receiving shared image devices receiving the same flash light substantially simultaneously).

Figure 2:
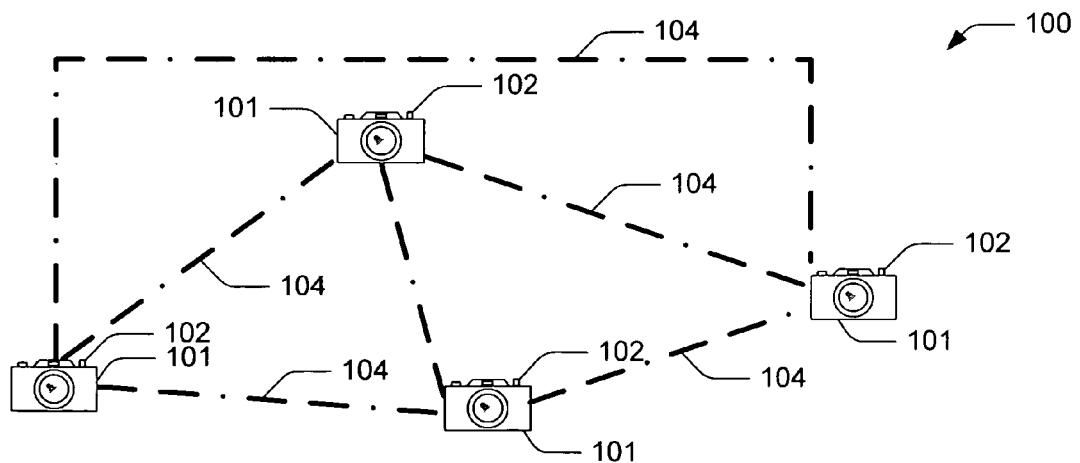
FIG. 2 shows a schematic diagram of another embodiment of the shared image network that includes a plurality of shared image devices, the plurality of shared image devices including a sharing mechanism.
Figure 3:
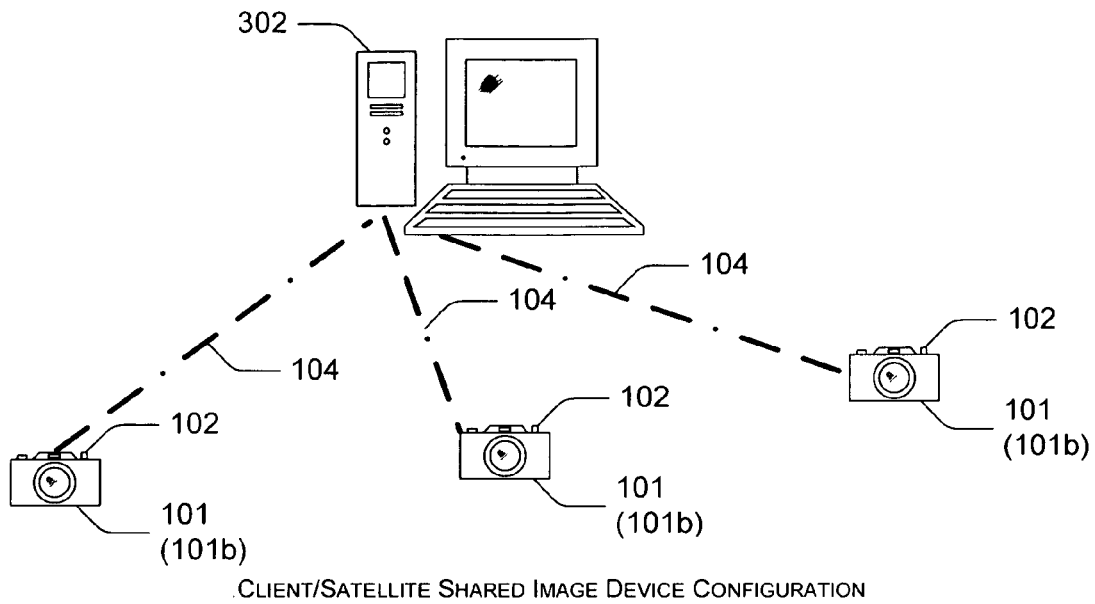
FIG. 3 shows a schematic diagram of yet another embodiment of the shared image network that includes a plurality of shared image devices, the plurality of shared image devices including a sharing mechanism.

In many embodiments such as described with respect to FIGS. 1 to 3, the authentication of multiple shared image devices 101 with respect to each other implies that the shared image devices 101 be proximate by being sufficiently closely spaced (considering the technology to be utilized) to allow communications therebetween, such as over wireless communication links. Authentication and/or authorization to share images, image information, etc. with other shared image devices can often be inferred by geographic proximity, depending upon the particular situation (while in other embodiments, this is not true). As such, in certain embodiments, shared image devices 101 that are associated with a particular wedding, children's birthday party, business meeting, or other event, etc. may establish the implicit/explicit authorization between multiple shared image devices (such as digital cameras or camcorders) based at least partially on the geographic (e.g., physical) proximity between shared image devices, and resulting at least partially from those shared image devices being located at the same event or sharing session. Many of the concepts described herein can also be expanded into other forms of geographic or temporal proximity depending upon the particular technology to be used.

Proximity based on geography can range to a variety of dimensions including from within inches, to in the same room, to within the same building, to capable of accessing the same wireless LAN, to in the same stadium or part of a city, or beyond depending upon the technologies associated with the particular application or the communication link. In considering certain commercially available transmitter/receiver capabilities, Bluetooth (a trademark of the Bluetooth Special Interest Group, a trade association) has an effective range of approximately 10 meters; and Wireless Fidelity (WiFi, and is meant to be used generically when referring of any type of 802.11 network) that can be located in a house or building, and can have an arbitrarily large range, especially when replicators or repeaters are located in each communication link 104 between multiple pairs of shared image devices 101. As such, shared image devices 101 can effectively communicate to each other through relatively extensive communication links 104. If a particular shared image device 101 has WiFi capabilities, the shared image device can be considered as having access to the Internet.

If the shared image network 100 is established as a close-proximity shared image network, each user can be provided with their individual "shared image device" 101 that can each be somehow be proximally located with respect to the sharing image network during its sharing session, and each shared image device is configured to join the sharing session, and can synch their shared image device 101 to the current shared image devices.

In certain embodiments but not others, one shared image device 101 can continuously have its sharing mechanism actuated as to be in a sharing state. For example, one user can walk into a room with three friends that are currently enrolled in the sharing session, position the new shared image device 101 within the proximity of at least one of their shared image devices, and the shared images can be transferred utilizing such a technique such as being quick-synched to the new shared image device 101 over the communications link, or some other communications technique.

Certain commercially-available cellular phones include embedded cameras (therefore providing photographic capabilities) that can be configured such that the images are transferred from that camera cellular phone to at least one other camera cellular phone, at least one land-phone, or at least one other receiving device using either a wireless or some other suitable connection. These commercially-available camera cellular phones can thereby be considered to "push" one or more images to another device (such as a cellular phone, a computer, a personal display assistant (PDA), etc.) with a display. Such transfer mechanisms that "push" these pictures utilize the Internet, e-mail, or a similar file-transfer addressing mechanisms. Many such commercially available camera cellular phones, however, can utilize addresses (e.g., e-mail address or some associated addressing scheme) to be utilized by the participating shared image devices to receive the photographs. In certain embodiments, addressing the data associated with photographs can take some time (while in other embodiments such addressing may be simplified), and can be especially difficult in certain situations where the address of the recipient shared image devices 101 is unknown or inaccessible.

Many embodiments of shared image devices 101, as described within this disclosure, that include the sharing mechanisms 102 can transfer copies of shared images to at least one other shared image device 101. Such transfer of copies of shared images can thereby allow accessing of certain images, videos, audio, and/or other types of media produced by the other shared image devices 101 during a prescribed sharing session. Many embodiments of shared image devices 101 do not provide an addressing mechanism to transfer the shared images between different ones of the sharing devices (e.g., capturing and/or peripheral devices) during a particular sharing session. As such, transfer of data between many of the embodiments of the shared image devices can best be considered as a controlled-broadcast, without utilizing an addressing mechanism. FIGS. 1 to 3 show a number of embodiments of the sharing image networks 100, each of the sharing image networks can include a number of similarly configured shared image devices 101, in which each of shared image devices includes its respective sharing mechanism 102.

In this disclosure, the term "similarly configured", or alternatively "similar" as applied to shared image devices 101, pertains to how each shared image device 101 processes or relates to its respective shared images. For example, certain embodiments of digital cameras can be configured as capturing shared image devices that are capable of capturing, transferring, retaining, or obtaining such shared images as still images or motion images. In the embodiment as described with respect to FIGS. 1 and 2, shared image devices 101 are each configured to be similar in general structure or operation, such that each shared image device includes a digital cameras that can capture, photograph, display, generate, receive, or process similar shared images such as digital images or video.

The resolution, imaging quality, and imaging characteristics of shared images are dependent on that particular shared image device which is performing the imaging. As such, even though shared image information may be copied and/or shared from one shared image device to a number of other shared image devices, the imaging quality of that shared image depends on the shared image device that captured (e.g., photographed or imaged) the shared information. As such, in certain situations it may be desirable to capture many of the images with a high-quality shared image device (e.g., a relatively expensive high resolution) by using a number of shared image devices of the types as described in this disclosure.

Under different circumstances, certain users of the shared image devices may desire to store a relatively large number of captured images within their shared image device. As such, it may be desirable for one or more lower-resolution shared image devices to capture the images. In other circumstances, the resolution of the images that can be taken by the different shared image device(s) may not be a deciding factor. Perhaps a particular shared image device is being used by a particularly good photographer. Alternately, perhaps a particular shared image device is directed at a particularly desirable subject. Perhaps a particular shared image device is recognized as taking better pictures under certain circumstances than another shared image device, for some known or unknown reason. As such, many participants in the sharing session may be interested in obtaining such shared images of good quality or value. The reasons described herein are illustrative and not intended to be limiting in scope.

The combination of the shared image devices for a particular sharing session, as described in this disclosure, provides a technique by which one or more particular shared image device can be selected to capture a particular shared image of a type such that shared image device may be the most appropriate.

Many embodiments of digital cameras can capture, process, display, generate, or receive digital images. In this disclosure, reference is made to certain shared image devices transmitting, receiving, capturing, and/or otherwise processing the shared images. Certain shared image devices 101, e.g., printers, fax machines, PDAs, copiers, etc., may generally not be considered as similar devices to digital cameras since printers can only print, retain, or display shared images, and cannot capture shared images. Shared image devices that do not capture images are referred to herein as peripheral shared image devices, and are configured to perform dissimilar functions with respect to the shared images from the capturing shared image devices. A sharing mechanism may be configured to convey audio, data, or a variety of other types of information either alone or in combination with the capturing images and other imaging operations as described herein.

The embodiment of the sharing image network 100, that is described with respect to FIG. 1, can be referred to as a master-satellite configuration since one of shared image devices 101 (which is designated as the master shared image device 101a for a particular sharing session) receives the shared images generated by itself and/or other ones of the satellite shared image devices 101b that are designated in FIG. 1 as 101b. The satellite shared image devices 101b can be operatively coupled to the master shared image device 101a such that in the certain embodiments: certain ones of the portions of the shared images that may have been captured or created by the shared image devices 101 during the sharing session can be shared as desired among the satellite shared image devices 101b.

In certain embodiments, the satellite shared image devices 101b can also receive certain ones of the shared images that may have been captured or created by the shared image devices 101 during the sharing session, receive lower resolution versions of the received shared images that have been captured during the sharing session, or are available for obtaining during the sharing session.

In the embodiment of the sharing image network 100 that is described with respect to FIG. 1, each similar satellite shared image device 101b can be operably coupled to the master shared image device 101a by, for example, a respective signal connection such as a communication link 104. The communication link can in certain embodiments be segmented into a transmitter portion or receiver portion, or alternatively a transceiver portion that is secured to each shared image device. Certain embodiments of the master shared image devices 101a can thereby control the shared images that can be received by each particular satellite shared image devices 101b. In other embodiments of the sharing image network 100 that include a master of the shared image device 101a; a signal connection such as the communication link 104 can also extend between certain ones of the satellite shared image devices 101b.

Each communication link 104 should be designed to provide sufficient bandwidth to ensure effective transfer of the shared images (e.g., images, portions of the images, metadata, video segments, and/or video stills) between the appropriate shared image devices 101. Providing such effective shared image transfer can ensure satisfactory operation of the sharing image network 100 as described in this disclosure.

In the embodiment of the peer-to-peer shared image network 100 as described with respect to FIG. 2, each shared image device 101 is connected to each other shared image device by at least one of the connections such as the communication links 104 such as provided by geographic proximity. It is also envisioned, that in certain embodiments of the peer-to-peer shared image network 100, indirect connections such as communication links 104 can be established to extend in series between multiple pairs of shared image devices even in the peer-to-peer configuration. Such communication links 104 can therefore transmit shared images between multiple pairs of serially-extending shared image devices 101 or over multiple serially-extending communication links 104.

The FIG. 2 embodiment of the shared image network 100 includes a number of shared image devices 101 that may operationally be considered as in a peer-to-peer network configuration. Certain embodiments of peer-to-peer shared image networks are configured in which each shared image device can perform both those functions that are traditionally associated with a server device and those functions that are traditionally associated with a client device. As such, in many embodiments, shared images can pass between different ones of the peer-to-peer arranged shared image devices relatively freely as to be made available by any one of shared image devices that is a member of a particular sharing session.

It is envisioned that in certain embodiments of the sharing image network 100, each shared image device 101 is configured to be capable of accessing the shared images captured by other ones of shared image devices 101 during the sharing session. Those embodiments of shared image devices 101 that can access certain ones of the shared images captured by the other ones of those shared image devices during this sharing session are likely to be configured and/or designed to follow certain aspects of the peer-to-peer model, as described with respect to FIG. 2; since this configuration is relatively simple and since no mechanism is required to reduce the number of shared images that are being transmitted by any one of shared image devices 101.

Certain embodiments of the peer-to-peer model may be easier to implement since with the peer-to-peer model, each shared image device 101 (such as a digital camera) can be configured to operate similarly to the other shared image devices. In many instances with the peer-to-peer model, there is no shared image device that overviews the entire operation of the shared image network. For example, each shared image device can be configured to include a similarly-operating sharing mechanism that can be configured to act as either a client and/or a server at any particular time during shared image network operations with respect to any other particular shared image device.

FIG. 3 shows another embodiment of the sharing image network 100 that includes a number of shared image devices 101. This embodiment is similar to the embodiment as described with respect to FIG. 1, with the exception that the master shared image device 101*a* is configured as a dissimilar device, e.g., a server 302 (e.g., computer) instead of another type of shared image device 101. The server 302, as well as other shared image devices, can provide a store-and-forward operation by controllably storing for some duration (regardless of how temporary or permanent is the duration), optionally processing, and then forwarding the shared images. Such networking concepts relating to clients, servers, and data transfer between computers as are generally well-known, and will not be further detailed in this disclosure. One purpose of the server device 302 with respect to the shared image network 100 is to obtain or retain the shared images generated by the other shared image devices 101, and thereupon provide for the retrieval of the generated shared images.

Those familiar with certain network terminology will recognize that servers are often named based at least in part to the data that they can store or produce (e.g., file servers, data servers, web page servers, etc.). As such, certain embodiments of the server device 302 as described with respect to FIG. 3 can be considered as a shared image server. One advantage of using certain embodiments of server devices 302 instead of certain embodiments of master shared image device 101*a* (in a master/satellite configuration) is that the server device 302 is likely to be configured to allow more sophisticated image processing, data handling, and other operations.

As such, certain ones of the satellite shared image devices 101*b* can be configured as the server devices 302 to be capable of handling relatively sophisticated queries relatively quickly and accurately. In certain embodiments, the users of certain shared image devices 101 can therefore include queries that are directed to the particulars of shared images that are being sought. Another advantage of certain server devices 302 is that the storage capability of certain embodiments of the server devices can be substantially matched against an upper value of the number of shared images that are likely to be captured during a sharing session.

Example of Proximity-Based Sharing Technique

Figure 4:
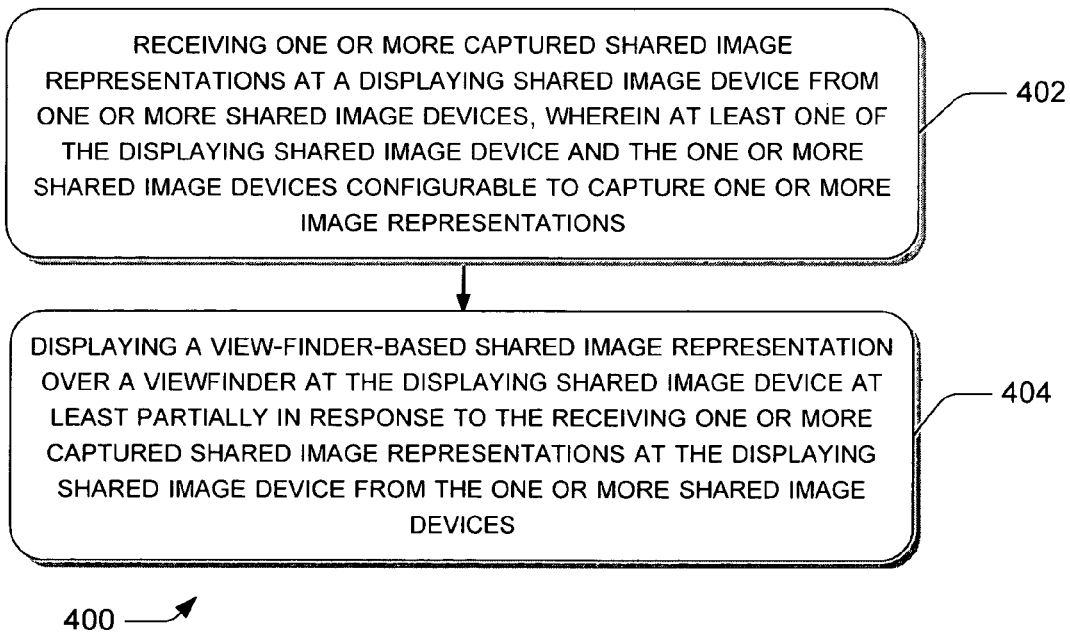
FIG. 4 shows a flowchart of one embodiment of a sharing technique that can be performed by certain ones of the shared image devices as described with respect to FIGS. 1 to 3.

This disclosure described a number of embodiments of proximity-based sharing techniques that which sharing of images can be provided between multiple shared image devices 101. FIG. 4 describes one embodiment of a proximity-based sharing technique 400 that can be performed using a computer or controller of the type described below with respect to FIG. 10. Within the disclosure, flowcharts of the type described with respect to FIGS. 4 and 5 are intended to apply to methods steps as performed by a computer or controller following certain aspects of the flowchart, and also apparatus devices such as either a general purpose, or specialized purpose, computer whose structure along with the software, firmware, electro-mechanical devices, and/or hardware, can performs the technique described in the flowchart.

The embodiment of the proximity-based sharing technique 400, as described with respect to FIG. 4, includes portion 402 that includes receiving one or more captured shared image representations at a displaying shared image device from one or more shared image devices. At least one of the displaying shared image device and the one or more shared image devices configurable to capture one or more image representations. The proximity based sharing technique continues to portion 404, that includes displaying a view-finder-based shared image representation over a viewfinder at the displaying shared image device at least partially in response to the receiving one or more captured shared image representations at the displaying shared image device from the one or more shared image devices.

Figure 5:
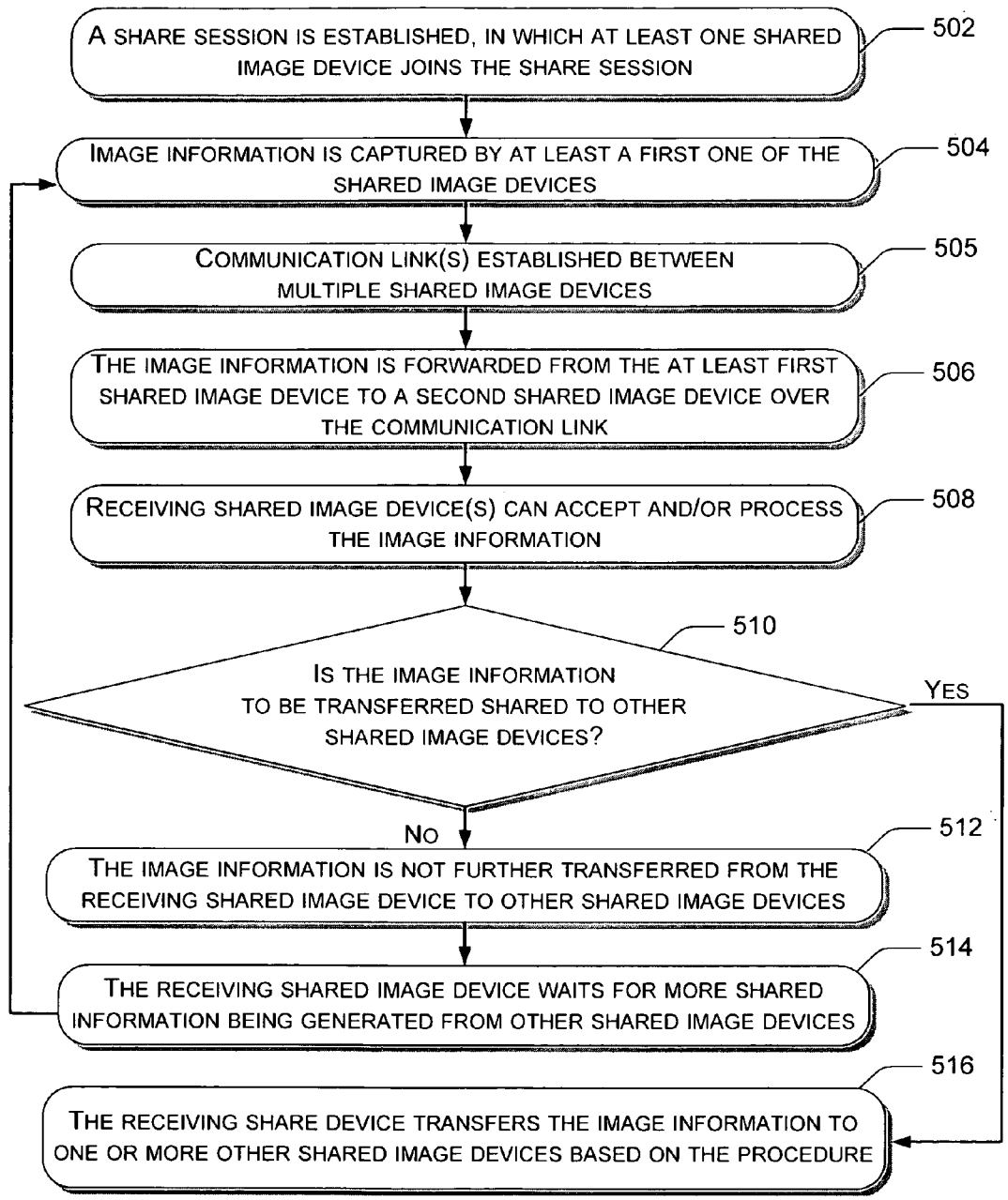
FIG. 5 shows a flowchart of another embodiment of a sharing technique that can be performed by certain ones of the shared image devices as described with respect to FIGS. 1 to 3.

Another embodiment of the proximity-based sharing technique 500 is described with respect to FIG. 5. A proximity-based sharing technique of 500 includes establishing a share session at portion 502, in which at least one shared image device joins the shared session. In portion 504, image information is captured by at least a first one of the shared image devices. Capturing can include imaging of such images as a full still image, a portion of the still image, information such as metadata pertaining to the image, or a thumbnail of an image. Capturing can also include imaging from a motion image of one or more frame(s), portions thereof, or information such as metadata pertaining to the image. In portion 505, communication links of types that are referred to as 104 in FIGS. 1 to 3, are established between multiple ones of the shared image devices. As mentioned above, such communication links 104 rely upon proximity of one type or another.

The proximity-based sharing technique 500 continues to portion 506 in which image(s) or image information is forwarded from the at least first shared image device to other shared image device over the communication link. In portion 508, at least one receiving image device can accept and/or process the image information. In decision 510, it is determined whether further image information is to be transferred (shared) from the first shared image information. If the answer to decision 510 is yes, then the proximity-based sharing technique 500 continues to portion 516 in which the receiving shared image device transfers the shared image information to one or more shared image devices.

If the answer to decision 510 is no, then the proximity-based sharing technique 500 continues to portion 512 in which the image information is not further transferred from the receiving shared image device to the other shared image device. Following portion 512, the proximity-based sharing technique 500 continues to portion 514 in which the receiving shared image device waits for more shared image information being generated from other shared image devices. In one embodiment, following portion 514, the proximity-based sharing technique 500 continues to portion 504 as described above.

Since multiple shared image devices are used to share data (at least one that sends the shared image information and at least one that receives the shared image information), each shared image device can be considered to form a portion of the sharing mechanism. In certain embodiments, actuating the actuating mechanism of a sharing mechanism can cause a particular shared image device to share or publish to other similar shared image devices. Such sharing or publishing can occur even if there is not another shared image device in sufficiently close geographic proximity, based largely on inclusions of additional shared image devices (each of which includes a store-and-forward mechanism). The additional shared image devices can be configured to allow serial data transmission through a sequence of such intermediate located shared image devices that operatively couple the terminal shared image devices. The store-and-forward mechanism can temporarily store data in one of these shared image devices, and can generate copies of stored shared images in the form of data from that shared image device following a desired prescribed duration.

Under certain circumstances, at one particular time, only one shared image device can be a member and be used to capture shared images. For example, if a user of a particular shared image device 101 is the first one to join a sharing session (e.g., get to an event), then that first user may desire to capture pertinent images, and the sharing mechanism allows others to access the pictures captured by the first user of a shared image device 101 at that sharing session. As such, at one particular time, only a single shared image device may join the sharing session, and effect sharing or copying of the shared images. For example, prior to a wedding or child's birthday, a professional photographer may capture a number of pictures that pertain to preliminary events of that sharing session, and which would be valuable to a number of the users of the shared image devices who would conceivably join that sharing session. In another instance, a leader of a business meeting may prepare one or more shared images prior to that meeting, and which would subsequently be accessible by other members of the meeting.

In other embodiments, at least two shared image devices 101 might be utilized to establish a particular sharing session. For example, assume that multiple shared image devices are configured as disposable cameras whose images can be jointly shared, processed, or made accessible following the sharing session. In certain embodiments, but not others, multiple shared image devices (such as those of the disposable variety) can be sold together to be associated with a prescribed sharing session, such as a birthday, wedding, business event, etc.

Other embodiments of shared image devices are likely to be associated with a single owner for a longer duration, and can be provided with an controllable sharing mechanism to allow multiple shared image devices to be controllably configured to interface with each other for a distinct duration of, e.g., a distinct sharing session. Many embodiments of the shared image devices that can be controllably configured can thereupon be adjusted to allow the shared image device to join another session, or in certain embodiments perhaps even multiple simultaneous sharing sessions.

In considering certain embodiments of the master-satellite configuration as described with respect to FIG. 1, the master shared image device (and perhaps not the satellite shared image device) can originally access the full resolution versions of the shared images as captured by each shared image device. In certain embodiments, satellite shared image devices can be provided with the shared images in a lower-resolution form such as thumbnails of the shared images, portions of the shared images, miniaturized portions of the shared images, low-resolution versions of the shared images, metadata pertaining to the shared images, etc. The users at the satellite shared image devices can then select those shared images that they desire to obtain or retain.

The particular configuration of shared image devices and the shared images can largely represent a design choice. These particular configurations can be selected depending upon the particular sharing session, event type, shared image device 101 type or other operational characteristic. Such configurations can be selected by the "owner" or participants of each particular sharing session. In some embodiments where a satellite shared image device has insufficient memory storage to store the full versions of the shared images that have been captured for a particular sharing session, the master shared image device can be provided with sufficient data storage to contain the full versions of the shared images that are being captured during the sharing session.

In certain embodiments but not others, at least some of the shared images that are being stored at the master shared image device will have the highest resolution available so that when the full images are requested from the at least certain other ones of the shared image devices, the full images can be provided.

In certain embodiments of the shared image networks of shared image devices 101 (while not with other embodiments), one purpose is to ensure those shared images captured by each one of shared image devices have been accessed, captured, stored, printed out, or has undergone some desired action. As such, in certain embodiments, each shared image device 101 may not obtain all the copies of each shared image that is generated by every shared image device for that sharing session. As such, in certain embodiments, it may be useful for a user of at least one shared image device 101 to provide a peripheral device (such as a printer or portable image storage device such as a CD drive) at a sharing session, and thereupon print and/or obtain and/or retain the desired shared images for each user of the member shared image devices 101 that are associated with the sharing session who wish to have the images in printed or stored form.

In one embodiment, a timeout mechanism can be provided on one particular shared image device 101. As such, if a user of a shared image device 101 leaves the sharing session, and they forget to deactivate the sharing mechanism, then the sharing mechanism can utilize a timeout mechanism to substantially automatically deactivate after a prescribed amount of time. Certain embodiments of the sharing session can include multiple shared image devices 101 that each include a timeout mechanism such that the sharing session terminates soon after the last member of the sharing session (and their shared image device) leaves the proximity of the session.

Examples of Sharing Images with Peripheral Shared Image Devices

Figure 6:
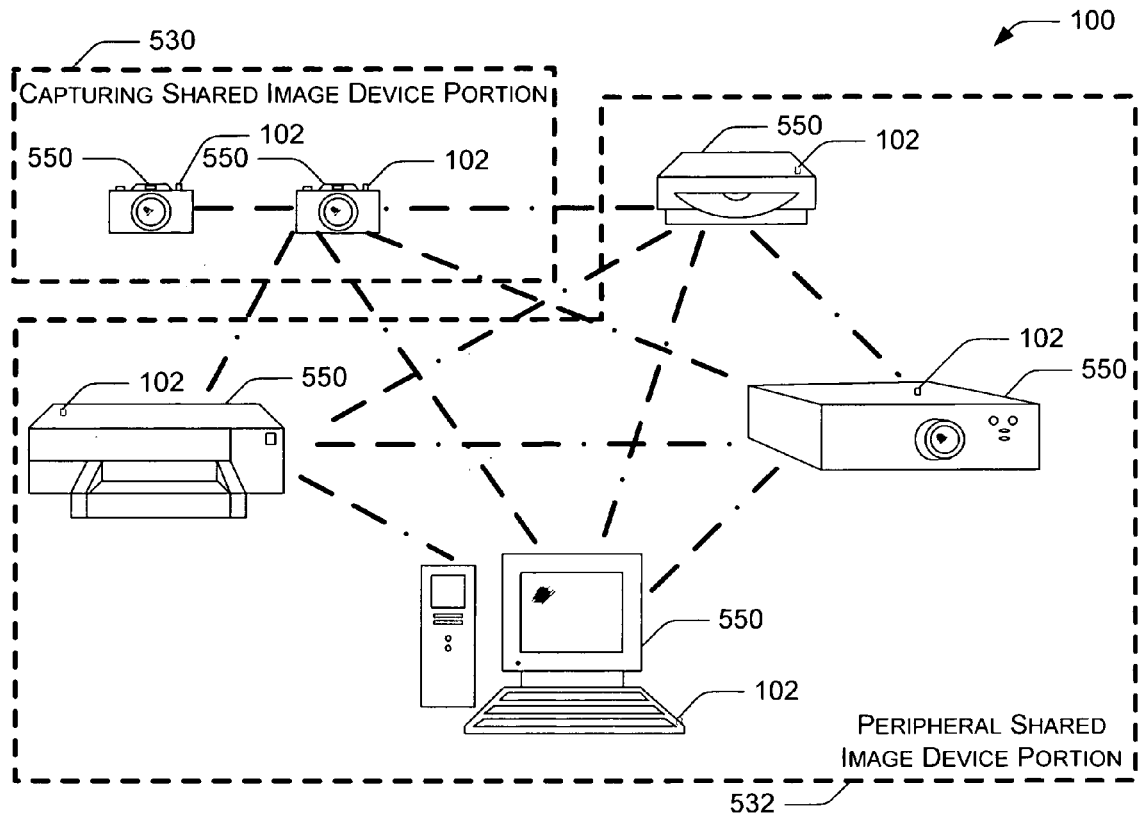
FIG. 6 shows a schematic diagram of yet another embodiment of the shared image network that includes a plurality of shared image devices, the shared image devices including a sharing mechanism.

FIG. 6 shows another embodiment of the shared image network 100 that can include a number of shared image devices 550, in which many of shared image devices 550 are incapable of capturing images and are thereby are in many ways dissimilar from those embodiments of the capturing shared image devices that are described in this disclosure. In FIG. 6, a number of shared image devices are contained within a peripheral shared image device region 532; additionally, one shared image device is contained within a capturing shared image device region 530. Those shared image devices that are contained within the capturing shared image device region 530 are configured as capturing shared image devices, to primarily capture images (e.g., take images, image information, or photographs). Those shared image devices that are contained within the peripheral shared image device region 532 are configured as peripheral shared image devices, to primarily to perform some other function to the shared images from capturing including, but not limited to, storing, displaying, transferring, printing, segmenting, and otherwise processing.

For example, it may be desired to couple a capturing shared image device such as a digital camera or camcorder with certain peripheral devices such as a printer, a projector, a computer, and/or a CD burner, certain of which may be associated with the same user. Such a combination of dissimilar shared image devices might, or might not, be associated with a similar combination of shared image devices. For example, one or more shared image devices such as a digital camera can be associated with a dissimilar shared image device such as a printer, computer, or projector either for a particular sharing session or permanently.

Alternatively, one or more capturing shared image devices such as a digital camera or camcorder can be associated with a dissimilar shared image device such as a printer, computer, or projector. Each of these dissimilar shared image devices may be capable of utilizing the shared images in a distinct manner. However, each of the shared image devices 550 could also share similar shared images relating to a single group sharing session (such as digital images) in its own distinct manner.

In certain embodiments as described with respect to FIG. 5, the printer, or other dissimilar shared image device, can be configured to be a peer in a peer-to-peer configuration, or alternately a master or satellite in a master-satellite configuration, during the sharing session. For example, one shared image device could be configured as a capturing shared image device such as a digital camera or camcorder at the session to capture shared images from other capturing shared image device as described with respect to FIGS. 1 to 4. In certain embodiments, but not others, the users can access other pictures based on the thumbnails that are provided. As such, a printer peripheral device can be used to print out, or a memory device can store, a certain number of the thumbnails, portion of images, or full shared images that can be selected by the user at one or more of the shared image devices 550. A projector can be configured as a peripheral device that can project a variety of images for that session. Peripheral shared image devices that are configured as a printer can print selected shared images from that same group sharing session. Yet other peripheral shared image devices that are configured as a CD burner or storage can more permanently store image information for a particular session.

Figure 7:
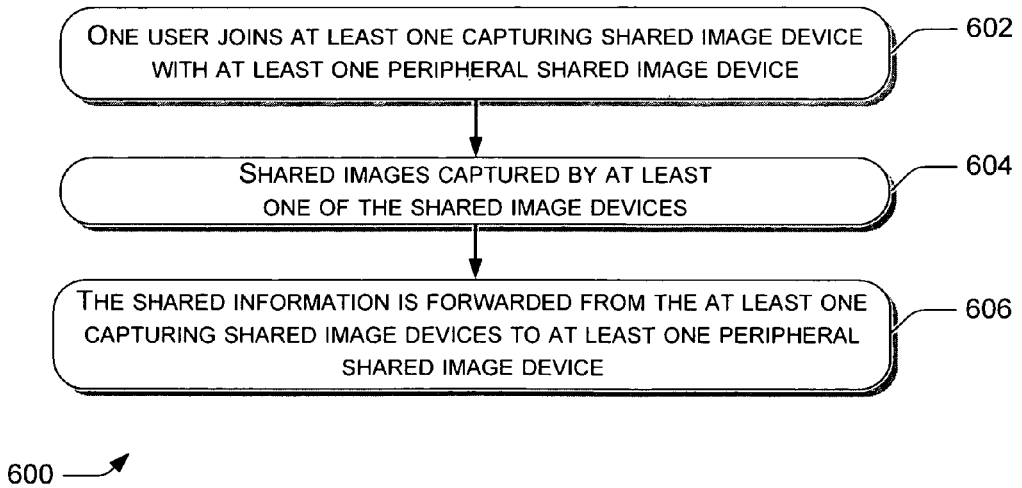
FIG. 7 shows a flowchart of another embodiment of a sharing technique that can be performed by certain ones of the shared image devices as described with respect to FIG. 6.

FIG. 7 shows a flowchart of another embodiment of a sharing technique 600 that can be performed by certain ones of the shared image devices as described with respect to FIG. 6. The sharing technique 600 includes portion 602 in which one user joins at least one peripheral shared image device and at least one capturing shared image device. In one embodiment, at least certain ones of the capturing shared image devices can be configured to capture shared images, while at least certain ones of the peripheral shared image devices may not be configured to capture shared images, but instead to store, process, display, or perform some other operation relative to the previously-captured images.

The embodiment of the sharing technique 600 continues to 604 in which the at least one shared image is generated by at least one of the capturing shared image devices. In portion 606, the shared information is forwarded from at least one shared image device to at least one peripheral shared image device.

From a high-level aspect and embodiment, a variety of distinct types of shared image devices can therefore utilize the sharing mechanism. As such, a single user might actuate a single sharing mechanism to cause a sharing of images between the printer and the digital camera (or other examples of commonly-controlled peripheral or capturing shared image devices). In certain embodiments, peripheral shared image device(s) can be networked with one or more capturing shared image devices that are owned by multiple users at a given sharing session. In other embodiments, only some of, or none of the shared image devices might be owned by the owner of the printer. Consider that in some embodiments but not others, both the printer and at least some of the digital cameras rely upon the same sharing mechanism for the sharing session. In certain embodiments but not others, a peripheral shared image device that is configured as a shared image-server, that could function to transfer stored image data back to another server, could include a sharing mechanism with the other server.

A variety of peripheral shared image device(s) 101 can be used to store, or display, shared images that are produced by a digital camera or camcorder shared image device. In certain embodiments, a peripheral device such as a projector or television shared image device 101 can be associated with a digital camera or camcorder capturing shared image device to provide a slide show or movie including the shared images provided by the latter. In other embodiments, a digital video disk (DVD) recorder can burn a CD containing shared images provided by a digital camera or camcorder shared image device. These different embodiments of shared image devices that can be configured as capturing and/or peripheral shared image devices can still be considered dissimilar in certain embodiments but perhaps not in other embodiments.

Examples of Sharing Mechanisms

To provide improved consumer electronics, it is desired to provide a simplified sharing mechanism to accomplish the desired task for that shared image device 101. The image-based products produced by such large-scale electronics/computer manufacturers such as Hewlett-Packard, Xerox, Sony, and a variety of other companies (all registered trademarks of their respective companies) determine those consumer-electronic devices that most could have sharing capacity. To appreciate the large variety of shared image devices 101 that could benefit from sharing capability and thereby become either a capturing or peripheral shared image device of, one can walk-through a large consumer-electronics store, or alternatively consider the variety of consumer device patents in the USPTO.

Certain shared image devices 101 might have a prescribed design behavior when associated with a group of shared image devices. Consider that each shared image device has a traditional function such as photography, printing, computing, etc. It is also possible that some shared image devices can perform a function that differs from their traditional function for a particular sharing session.

Theoretically, the share mechanism can be configured to operate relatively simply and straight-forward to cause sharing between multiple shared image devices, such as has become generally accepted with, e.g., the ease of operation afforded by a shutter button that triggers a camera. Additional complexity may be used in certain embodiments of shared mechanisms to provide additional functionality such as to select particular shared image devices that can join a particular sharing session. One embodiment of such additional complexity relates to establishing a "buddy list" between multiple shared image devices as described later in this disclosure. Certain embodiments of shared image devices, but not others, could be provided as a packaged item that provides sharing functionality to more traditional image capturing devices such as digital cameras, camcorders, etc.; such as by providing shared image operations to traditionally peripheral devices such as device printers, shared image device to DVD burners, etc.

In certain embodiments, shared image devices select those shared images that have been captured by at least one other shared image device, and can cause them to obtain. Peripheral are capturing the shared image devices such as cameras, camcorders, DVD burners, or printers, etc. can be associated as a shared group. In one embodiment, it may be desired to provide a near-real-time data-transfer between the different shared image devices 101. In other embodiments, the rate of data transfer may not be as important and the rate of data transfer can be decreased. The particular share mechanism should be adaptable to the uses, designs, operations, and other considerations of the shared image devices.

Examples of Shared Image Devices Having Password Proximity

It has been described above how to integrate a number of shared image devices 101 into the shared image network 100 based upon the proximity (either geographic or based on the communication link 104) of the shared image devices 101, and also based on actuation of the respective shared mechanisms. In the geographic proximity-based embodiments, shared image devices can be located relatively close to each other depending upon the particular technology utilized.

In other embodiments, shared image devices can be operationally connected to each other (e.g., operationally coupled) such as by a spoken word or phrase, a captured picture, etc. The shared image devices may not be associated by physical proximity in certain embodiments, but not others. As such, physical proximity requirements can be effectively replaced by an authorizing password, a pass image, or a variety of similar pass mechanisms.

This portion of the disclosure thereby describes how a number of shared image devices 101 can join the sharing session based on passwords or a similar mechanism, instead of based upon the physical proximity. In certain embodiments of the shared image network 100, it may be desired to create group passwords to protect against use of shared image devices by non-participants. The shared image devices 101 within that particular sharing session can be configured to respond or operate pursuant to the password, pass image, etc. using suitable image recognition, speech recognition, pattern recognition, or other recognition programs. Consider, for example, one of the participants at a birthday party or other event creates a temporary community password for the session group.

Participants can enter the appropriate password, and thereby actuate the shared image device 101 using the sharing mechanism. In one embodiment, only those shared image devices 101 with the correct password will be allowed access to the camera community's shared images for that sharing session.

There are a variety of password mechanisms that can be used to provide password functionality to shared image devices 101. Straight-forward password mechanisms represent a relatively easy way. In one embodiment, the users of shared image devices 101 can be provided with instructions to type in a specific password, pass phrase, something the user says, something the user types, or some picture that can be possessed by the users in the sharing session. Such password, etc. that passes the appropriate recognition program can thereupon be used for authentication, etc.

One embodiment of a password that can also be recognized by a recognition program also includes a photographic-password. For example, consider that someone who wants to join a session can do so by submitting a captured image of an arm, a captured image of a thumb, a captured image of a shoe, a captured image of a prescribed number of fingers or some letter or number (or group thereof), or a captured image of some other physical characteristic whose shape or appearance would be recognizable using computer-based image recognition programs, etc. In another embodiment, at least some of the cameras are provided with a similar appearing card or piece of paper having some shape or pattern printed on them that represents a picture that can thereupon act as a password.

In another embodiment, the printed pattern could even include, e.g., a page or portion of a newspaper, or magazine, or a portion thereof. The pattern of text, or a photograph, or a physical shape should in many embodiments represent something that is easily recognized by a hardware, firmware, or software-based pattern recognition mechanism. In yet another embodiment, the pattern recognition software can even be applied to remote shared image devices, such that the members of the sharing session hold up some predetermined number (e.g., 5, 4, etc.) to join the sharing session. In this case the people can even be remotely located as in different cities or countries while allowing suitable operation of the shared image network 100.

The patterns discussed up to now that are recognizable by a pattern recognition system or device (such as a pattern or shape recognition program that runs on a general purpose computer or general purpose computer as described herein) that rely upon optical pattern recognition. It is also to be understood that many shared image devices, such as digital cameras or camcorders, could include voice input that could thereupon be compared against a speech pattern, an audio pattern, and/or a password or pass-phrase pattern using vocal recognition patterns. As such, a vocal or audio pattern search of a particular individual using vocal or audio recognition program, or using a particular spoken password, is within the intended scope of the present disclosure. Additionally, a spoken password can be compared to a voice recognition program for that password.

There are therefore a wide variety of graphic, photographic, image-based, local, or audio type passwords and pass-phrases that are within the intended scope of the present disclosure, and those described herein are not intended to be limited in nature. The general operation of recognition programs as run on captures and/or controllers are generally well known by those skilled in the art and will not be further detailed within this disclosure.

The sophistication, quality, expense, and functionality of shared image devices 101 that can be used to form the shared image network can therefore vary widely in different embodiments. In one embodiment, the satellite shared image devices 101*b* that are associated with the master shared image device 101*a* can be considered to be a relatively inexpensive device, such as cameras or camcorders that can each hold a prescribed amount of data at any given time. As such, the satellite shared image devices 101*b* can thereupon obtain or retain the data to the server-camera associated with that sharing session. In other embodiments, some of shared image devices 101 in the shared image network 100 can be relatively expensive and sophisticated, such that each shared image devices 101 can be configured to perform a specific function and/or specific operability.

A certain master shared image device 101*a* can alternatively be configured as a satellite shared image device 101*b* in a different sharing session or time. In one embodiment, the person giving the party, moderating an event, etc. can logically configure their digital image device to be the master. As such, certain digital image devices (e.g., digital cameras or camcorders) can be configured as the master or satellite depending upon the particular sharing session, and who is establishing or running the sharing session.

If a particular shared image is deleted, the deletion of the shared image can propagate through other shared image devices and/or users in certain embodiments. Although in certain relatively simplified embodiments, the deletion will not propagate through to other shared image devices. It may, also be desirable to apply an undo function to certain embodiments of shared image devices to remove bad pictures (images) so that they may not be shared.

In the peer-configuration, it may be desired to provide some "remembering" function such that the shared image network 100 remembers the contents of those particular shared images that were not shared before shared image devices lost proximity. An option may be to allow those shared images to be shared between shared image devices.

Examples of Sharing Sessions

As described in this disclosure, it may be useful in certain embodiments (while not in other embodiments) to incorporate some type of a sharing session that extends for the duration of a session to sharingly associate those member shared image devices to the sharing session. As such, the sharing session can be the duration over which certain embodiments of shared image devices 101 may share their shareable resources, such as still pictures or motion pictures.

There can be many embodiments of types of sharing sessions, as described within this disclosure. For example, in some sessions, the shared images that have been captured can be shared or copied between some of the other shared image devices 101. As such, if a number of shared image devices each captured an image (or portions thereof) for a particular sharing session, then some of the shared image devices can be expected to have a large number of shared images to capture, process, manage, consider, store, and/or view. In other embodiments of the sharing sessions, only a certain number of the images are shared or copied with certain shared image devices.

One embodiment of the sharing session may involve a group of users for a session (e.g., parents for a particular child's birthday party or sporting event), each of which have a shared image device that may be configured (authenticated or authorized) to gain access to the shared images at that event. In one embodiment, certain shared image devices 101 could obtain or retain shared images (e.g., pictures) even after they had left, but before the event has ended. It is likely that the shared image network 100 would utilize one or more wireless-links to provide the flexibility between the shared image devices such as is provided with certain local area networks. Alternatively, the images could be accessed later over e.g., wide area networks to obtain or retain large volumes of the data associated with a number of pictures.

For certain embodiments, it may be desired to allow a certain shared image device 101 to join a plurality of concurrent sharing sessions. A user would then be able to determine which one of multiple sharing sessions they wished to be a member. As such, such a shared image device 101 could obtain or retain information from at least certain other shared image devices from both/all of the concurrent sharing sessions. Access to the multiple sharing sessions can be covered by providing multiple passwords or pass-phrases that each relate to the different concurrent sharing sessions. In certain embodiments, it is therefore possible for certain shared image devices 101 to subscribe to multiple sharing sessions simultaneously. Logically, this sharing of one shared image devices into multiple sharing sessions can be envisioned as, e.g., a Venn diagram in which each shape represents one of multiple potentially-overlapping concurrent sharing sessions. In these embodiments, the sharing sessions that each shared image relates to can be identified; or in certain embodiments, a particular shared image device pertains to both/all of the concurrent sharing sessions. With many embodiments of sharing sessions that are established on peer-to-peer shared image networks similar to as described above with respect to FIG. 2; the networks can have the capability of replicating data that has been lost (or not obtained) by particular shared image device 101. As such, when a particular shared image device 101 joins the sharing session, it may be able to query at least some of the devices to obtain the shared images that have been captured through the beginning of that sharing session. As such, when a member of the sharing session or event arrives halfway through the event, they will be able to access that previously captured images, etc. that pertain to the sharing session.

Replicating of lost, or never obtained, data may be successfully performed in many peer-to-peer shared image networks. Such data replication represents an advantage of certain peer-to-peer shared image networks. This replication may not apply to sharing sessions that have already both started and ended, even for peer-to-peer shared image networks. As such, in many embodiments, users of shared image devices 101 that might have joined the sharing session after the sharing session has ended may not be able to obtain those shared images substantially directly (but perhaps can obtain the sharing session pictures from a friend or a family member). Certain embodiments of the shared image network 100 may include a concept of a synchronized master shared image device from which a latecomer can obtain the shared images.

Though dissimilarities exist between different types of sharing sessions between shared image devices 101, there can also be a great deal of commonality. For example, many embodiments of the sharing sessions can be identified by a unique session identifier. With certain embodiments of the sharing sessions, those who are attending should be able to access the shared images captured by some of the shared image devices 101 associated with that sharing session (while this may not be true in other embodiments of the sharing session). Many embodiments of sharing sessions rely on a broadcast by which images (or portions thereof or information relating thereto) are transmitted to other members of the session, in many instances without an addressing mechanism.

A user can get access to sharing sessions in certain embodiments after they have left that sharing session, such as a party. For example, the sharing session may be configured such that the members can access images relating to any portion of the shared session following the shared session from one of the session members (perhaps after providing a suitable password to rejoin and/or access images from the session). In certain embodiments, such sharing session members may be able to access the shared images after they leave the sharing session using a different mechanism, such as the Internet or another embodiment of network (e.g., or other shared image network). The particular configuration of the shared image network largely determines how current members, as well as past members, of the sharing session may access shared images from the shared image network.

Consider that for certain embodiments, when a user actuates a sharing mechanism 102 to join a particular sharing session, that they establish a sharing session identity (ID). For certain embodiments of shared image devices 101, they should be able to use the sharing session ID to later retrieve pictures even after they have left the event. For example, the password can be used as a host-name or sharing session ID for the event. Sharing session names can also default to easily remembered things such as date, name of the sharing session, etc. Shared image devices can be associated with one or more from a set of shared default keywords such as "party", "anniversary", "Christmas", "sports event", "business meeting", etc. For a number of embodiments, the information associated with each particular sharing session should be retrievable later from a central server, etc.

For a particular sharing session member who shows up late to the sharing session or meeting, it may be important that different session attendees have the capability of "pulling in" new members, and providing them the shared images going back to the beginning of the sharing session. For example, assume that there are four currently-joined shared image devices 101 in a session, and a new shared image device is being joined using the first shared image device to establish a new grouping of five shared image devices. Such joining techniques may, for example, rely on point-to-point communication, master-satellite communication, client-server communication, or other shared communication techniques. In one embodiment, for example, the user of the first shared image device 101 actuates the sharing mechanism that publishes the shared images to allow the joining shared image device to become part of the sharing session, and thereby gain access to the images already taken by other session devices. A number of different sharing session configurations for the sharing mechanisms can thereby be provided depending on the application or as a design choice. One embodiment involves a first person actuating the sharing mechanism 102, at which point other shared image devices within range may be able to access those. This embodiment could be considered as simply opening up some of the session information contained in one shared image device 101 to other shared image devices.

Another embodiment can be considered as a "published with synchronized timestamp", such that each user actuates the sharing mechanism at the same time to get synchronized, and therefore is able to somewhat control the dispersal of the shared images. Another embodiment can be referred to as a "shared plus password."

Examples of Ancillary Aspects for Sharing Mechanisms

Certain shared image device 101 concepts can also be applicable to business meetings, telephone calls, etc. As such, some participants in a meeting can copy, share, and/or distribute all, or selected shared images, or shared camcorder output, etc. relating to the meeting, even. This even applies to those members who arrived late.

Some embodiments of the sharing mechanism can also include a stop-publishing aspect of the sharing mechanism. In certain session embodiments, a stop-sharing mechanism or temporary halt publishing mechanism performs an inverse operation to the sharing mechanism as described herein. Suppose, for example, that a user in a shared image device 101 wishes to capture at least one private picture, and thereby temporarily disconnects from the shared image network to keep from sharing that image from the other members of the sharing session.

This can be the same or a different feature as a temporary-private mechanism such as a mute-image device. In this manner, a person in the party can temporarily disconnect their device from the shared image network 100 and/or certain shared images or portions thereof for a portion of the sharing session.

In one embodiment, a unique time-stamp can be provided to synchronize at least some of the digital devices in the sharing session, and the time can be measured with respect to the beginning of the sharing session. Each shared image device such as a digital camera or camcorder can thereupon utilize a universal sharing time. In one embodiment, at least some of the clocks for the different shared image devices 101 slave to a time corresponding to one of the devices for that sharing session. In another embodiment, at least certain shared image devices 101 slave to a sharing session time for that session. The selected sharing session time can rely on a distinct time-keeping mechanism.

In another embodiment, a "buddy list" can be integrated into a number of shared image devices that form a subset from within a larger group of shared image devices (e.g., the smaller group is identified to share or copy their shared images using the buddy list). Those shared image devices may elect to share or copy their images with other shared image devices sharing the same buddy list, but not share their "buddy-list" images with the group of shared image devices at large.

In one practical example, assume that one user of the shared image device 101 goes to a sports event with a group of friends. When that user, actuates the sharing mechanism using their buddy list, the shared image device synchronizes with other shared image devices on that buddy list, but not necessarily with the shared image devices at large. In one embodiment, the "buddy-list" group can be associated with a prescribed password, for example. There can be a variety of such embodiments of shared image devices that range from relatively simple to more complex. The use of the buddy list to actuate the share mechanism in certain embodiments of shared image devices can utilize certain passwords, such that those shared image devices that produce the passwords can join the buddy-list session.

A number of rules can be applied to the shared image devices that pertain to general concepts of time, space, and/or locations for capturing the shared images. Such aspects as buddy lists, the numbers of pictures that can be shared, stop-halt, temporary-halt, percentage of storage that can be shared, and the types of pictures that can be shared (e.g., private or public shared images) are exemplary aspects with respect to shared image devices.

Additionally, in one embodiment, photographers could prioritize their shared images. For example, certain shared images can vary in quality based on, e.g., content, interest, or quality of the shared image in a manner that can be either objectively or subjectively rated, or other such factors. Other users may select a shared image device to access only those shared images that are above a certain quality level (e.g. good, excellent, fair, etc.). Filtering of the lower quality images, measured by some objective and/or subjective standard, provides a technique to reduce the amount of data that has to be obtained or retained for each sharing session.

Certain embodiments of shared image devices can be configured to handle multiple sharing sessions. For example, suppose a user has a printer that can handle both a first sharing session and a second sharing session for a particular digital camera or camcorder. Different applications for the shared image devices could thereupon be useful in business, educational, sporting, governmental, police, or applications in which an individual obtains shared images for several concurrent events (or only one event that an individual is not attending). It might be desirable to allow a user to subscribe to the multiple sharing sessions substantially simultaneously. The personal computer (PC) can be configured as a peer (of a peer-to-peer shared image network configuration) that monitors the shared images that are being captured as to select a variety of shared images from multiple shared image devices.

In certain embodiments, a status indicator can be provided, either on the shared image device or separately, and which indicates to others that a particular shared image device is in its share mode. One example of a status indicator may be an indicator light, or an "active" indicator on the display of the shared image device. Other status indicators may display some information pertaining to the particular sharing session.

Examples of Viewfinders for Shared Image Devices

In certain embodiments, but not others, a sharing mechanism might be considered to function as a virtual picture frame or viewfinder that allows remotely-located shared image devices such as digital cameras or camcorders to capture shared images. Viewfinders therefore provide a mechanism for one shared image device to observe an image that has been, or is being, captured by another shared image device. As such, certain embodiments of viewfinders may be considered as operating to "share another shared image device's viewfinder". In one embodiment, a viewfinder at a first shared image device can display at least one image, or a portion thereof, that is being imaged at a second shared image device. The second shared image device acts by displaying over a viewfinder of a first image device the at least one image, or a portion thereof as it could appear at the second shared image device. Those embodiments of shared image devices 101 that are provided with viewfinders can be used by users to perform a variety of processing related to the shared images including, but not limited to, viewing the shared images, selecting those shared images to keep and those to discard, determine those shared images that will undergo further processing, and determine those shared images to select an increased resolution version of (e.g., when provided with thumbnails, image information or portions thereof, or metadata describing the image). For example, certain embodiments of viewfinders may display thumbnails of shared images. From the thumbnails, the user determines those shared images that are to be accessed in more detail (e.g., having a greater resolution).

Figure 8:
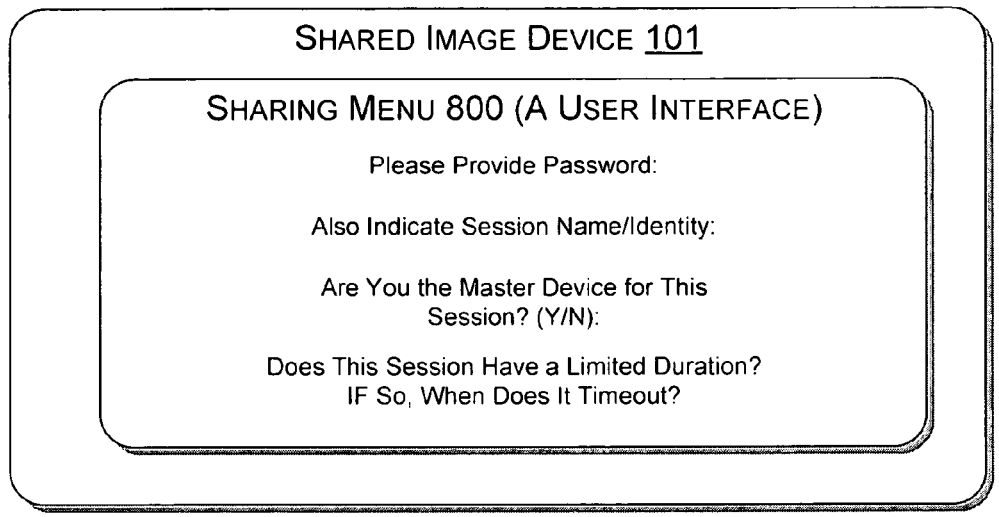
FIG. 8 shows one embodiment of a sharing menu display that acts as a portion of a sharing mechanism.

FIG. 8 shows one embodiment of a sharing menu 800 that is integrated within a shared image device 101. The sharing menu 800 can be integrated as a portion of the viewfinder of certain embodiments of the shared image device 101 (e.g., such as being located on the display of the shared image device). The shared image device can allow a user to join a particular session, for which they are proximately located using one of the above-described mechanisms such as geographic proximity, proximity by communications link, and/or proximity by password.

The sharing menu 800 can include a variety of questions, such as including input for the name and/or identity of the user, the user password, indicating whether this shared image device is the master device for a particular session, and indicating whether the particular session has a prescribed duration, and if so, when is the timeout. The embodiment of the sharing menu 800 as described with respect to FIG. 8 is illustrative in nature, and not limiting in scope. In actuality, the sharing menu 800 can have a variety of appearances, shapes, and/or questions.

Figure 9:
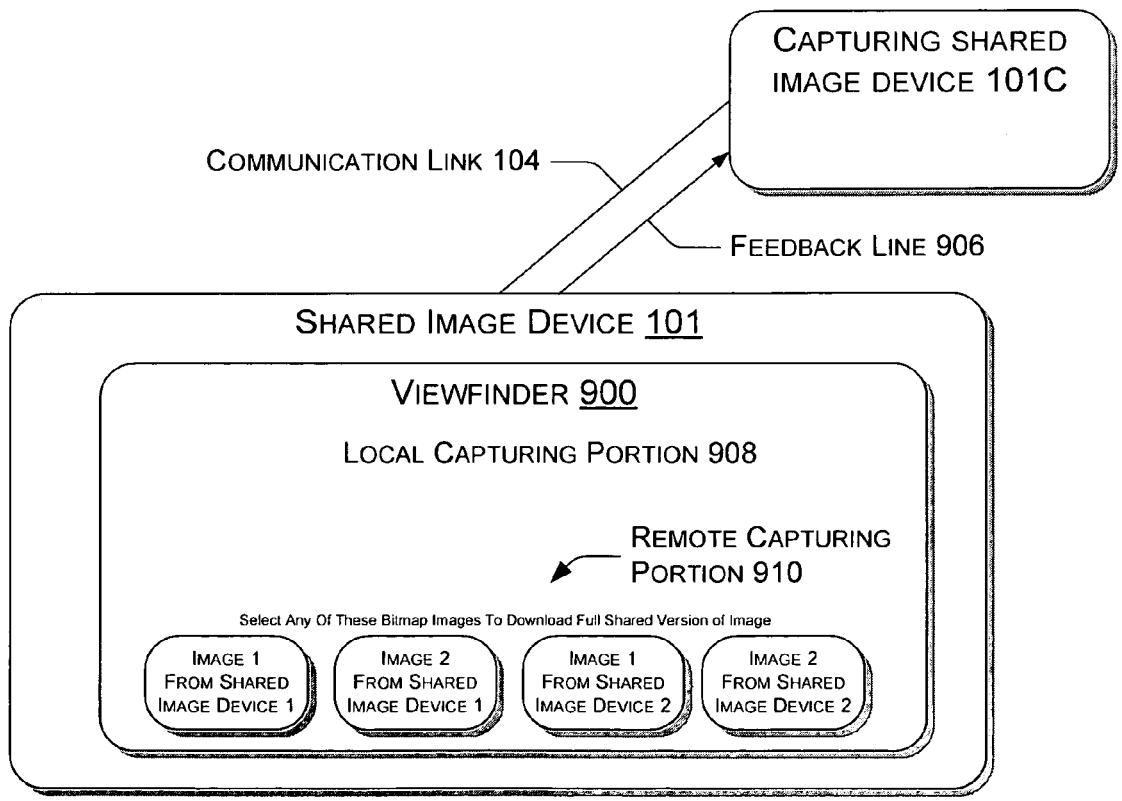
FIG. 9 shows a generalized front view of one embodiment of a viewfinder that can be integrated in a shared image device.

FIG. 9 shows one embodiment of a viewfinder 900 that is integrated within a shared image device 101. As described with respect to FIG. 9, the shared image device 101, such as a digital camera or camcorder, may be configured to capture and/or retain shared images. Alternatively, the shared image device 101 can be a portable image storage and/or display device, or a computer to obtain and/or retain shared images. Certain embodiments of shared image devices do not include the viewfinder 900, and as such would not be used to display shared images. In this disclosure, the viewfinder 900 refers not only to the traditional optical viewfinder, but also a liquid crystal display (LCD) or other display such as might be located on the back of the digital camera or camcorder.

As described with respect to FIG. 9, the shared image device 101 is in communication via a communication link of 104 with the capturing shared image device 101c. The viewfinder 900 can thereby display certain images captured by the instant shared image device 101 over a local capturing portion 908 of the viewfinder 900, and also display images captured by the remote capturing shared image device 101c over a remote capturing portion 910 of the viewfinder. As such, certain embodiments of the viewfinder 900 can display the remote capturing portion 910 in addition to the local capturing portion 908.

The selection of a relative display of the remote capturing portion 910 relative to the local capturing portion 908 over the viewfinder 900 is a design choice, and the present description is not intended to be limiting scope. For example, the remote capturing portion 910 of the viewfinder 900 and can be provided relative to the local capturing portion 908 as an overlying window, an underlying window, a top or bottom window, an additional box, overlying text that is physically typed above the local capturing portion 908, or a variety of other configurations that are known to those skilled in graphical user interfaces (GUIs) such as Windows (as designed and made commercially available by Microsoft) and Mac or Macintosh (as designed and made commercially available by Apple Computer).

Also described with respect to FIG. 9 is a feedback line 906 that provides a user interface between a shared image device 101 and another remote shared image device 101c. The embodiment of the feedback line 906 as described with respect to FIG. 9 allows a user at a local shared image device 101 to provide imaging input to a remote shared image device 101c. Certain embodiments of the feedback line 906 can be configured as a wireless link, similar in configuration to the communication link 104. In certain embodiments, the feedback line 906 can be integral with the communication link 104. Utilizing certain embodiments of the feedback line 906, the user at the shared image device 101 thereby provides feedback to the remote capturing shared image device 100 as to what they want to see, or to particulars of capturing current or future images.

In one embodiment, the feedback line 906 includes an audio transmission line, by which one user can indicate to another user at the capturing shared image device 101c to, perhaps, move the particular remote capturing shared image device 101 to another location, detect a different field of view, zoomed in or out, otherwise adjust the settings of the capturing shared image device, provide a shared image, do not provide a shared image, capture another shared image, to not capture another shared image, or perform a variety of other task(s) with the remote capturing shared image device 101*c*.

Non-verbal instructions, similar in nature to those described as being transmitted over the audio version of the feedback line 906, can also be transmitted over a text-based or other graphical version of the feedback line. For example, a user in one shared image device can indicate to a user and another shared image device to scan in another direction by using a series of the arrows or other recognizable indicators that are transmitted utilizing GUI nomenclature via the feedback line 906. One user can also type to a remote user to zoom in or out.

The different embodiments of the feedback line 906 can be added, in addition to those feedback lines that are integral with each communication link 104, as described in this disclosure. Increasing the types and amount of communications that can be transmitted utilizing the feedback line 906 can thereby provide more interaction between the users add remotely-located shared image devices, thereby potentially improving an overall image sharing experience.

As described in this disclosure, certain embodiments of the viewfinder 900 thereby can be configured in a variety of configurations to display the images in a variety of formats depending upon the type of the shared image device, the volume of data that is available to store therein, the amount of shared images that actually are stored therein, and the user input.

The viewfinder 900 may be utilized in a variety of shared image devices 101 to display certain shared images. As such, a first shared image device can capture or copy a shared image, or a portion thereof, from a second shared image device at a remote location from the first shared image device. Under these circumstances, the first shared image device can actually utilize the imaging aspects or equipment of the second shared image device. Instead of photographing a vision or scene with multiple shared image devices, the scene can be photographed by only one device, and the distributed images can be combined to be copied or shared with other shared image devices.

It is thereby possible in certain embodiments to utilize another shared image devices' viewfinder 900 including the local capturing portion 908 and the remote capturing portion 910; such that one user can see what's on somebody else's shared image device. Suppose, for example, one shared image device that is at a child's birthday party is positioned at a swing while a second is at a swimming pool. It may be desirable to switch between the images that appear in the viewfinder 900 of the multiple shared image devices.

This use of switching viewfinders 900 for the shared image devices can also be applied to business, educational, personal, or other applications. For example, there might be multiple blackboards or whiteboards in a classroom that can be captured by multiple shared image devices. Alternatively, a user may wish to view what is going on in one class while attending another. Certain embodiments of the shared image device as described in this disclosure can thereby, essentially, bookmark activities at another shared image device.

In certain applications, it may therefore be worthwhile to view somebody else's viewfinder 900 as opposed to just obtaining or retaining shared images that might have been captured. This also provides a technique to view the viewfinder 900 of another shared image device. For example, one shared image device can be used to indicate to a second shared image device that the subject of the first shared image device; as such, please capture an image at the second shared image device for the first shared image device.

Sharing or copying images between multiple shared image devices can thereby be considered as copying a capture image from the capturing shared image device to the other shared image devices (such other shared image devices can be configured either as a capturing and/or peripheral shared image device). The quality, resolution, and other characteristics of each shared image are initially determined by the image in properties of the capturing shared image device that captured that shared image.

Consider that, in one embodiment, a first shared image device has a higher resolution compared to other shared image device(s), such that relatively high quality shared images can be copied and distributed with other shared image devices (that are only capable of capturing lower resolution shared images). In certain sharing sessions, the best, or highest resolution, shared image device, or those used by the best photographer, can be used to capture shared images or portions thereof for other sharing devices in the sharing session. Each image or photograph can be captured by the particular desired capturing shared image device (highest resolution, least memory used, flash capability, demonstrated ability to take good shared images, etc.). The shared images captured by multiple shared image devices can then be copied or shared into each desired shared image device.

As such, a particular user may have a number of capturing shared image devices, each shared image devices is considered optimal to capture a particular type of image. The sharing mechanism as described in this disclosure thereby allows the shared image that is being captured by each of these capturing shared image devices to be transferred between these multiple shared image devices to one or more selected shared image devices. Those images received by the selected shared image device from each of these "optimized" shared image devices are thereby identical to those images captured by the capturing shared image device.

Certain embodiments of the viewfinder 900 provide a mechanism by which the shared image device displays those images which, in time, can be copied to at least one other shared image device.

In one embodiment, the viewfinder 900 is used to subscribe to data from other shared image devices. New functionality might be provided to one shared image device based on the images, data, and/or information being shared or copied from other shared image devices. For example, the viewfinder 900 might annotate its display to show which geographic areas have been sufficiently captured or covered by previous shared images. In the case where the shared image device 101 is a digital camera or camcorder, that new functionality may include an enhanced resolution, an occlusion removal, etc.

The viewfinder 900 can be utilized to publish the presence of its information to users. For example, the viewfinder might annotate its display to show those areas of a shared image that are most desired by other users. The user looking through the viewfinder 900 might alter the subject of the current shared image (such as by changing direction or zooming) based on what it detects as the most valuable people, places, or other subjects to photograph. Within this disclosure, the term "valuable" is highly subjective, and might refer to, e.g., an area that has not already been captured by other cameras (for example a particular child at a birthday party who has not been frequently imaged, a remote corner of a park at a particular time of day, a publicly-known individual, a group of individuals, or a person involved in an activity specifically requested by someone). Such determination of a particularly valuable individual or image can be input manually, or somewhat automatically using a recognition program or positioning program.

In certain embodiments, the viewfinder 900 can also indicate what has already been shared. Using image processing techniques, prior shared images can be considered. For example, children at a birthday party whose images have been captured (photographed) frequently might, in certain embodiments, appear differently within the viewfinder 900 compared to those having few captured images. In one embodiment, a user of a shared image device such as a digital camera or camcorder visually scans around a room during a sharing session such as a birthday party, those kids who have been photographed often might get some indication on the viewfinder 900. As an example, less captured subjects may "sparkle" compared with more captured subjects. In one embodiment, such functionality can be provided depending largely on the real-time recognizers that can analyze or store the identity of particular individuals. Areas in the viewfinder 900 that are more valuable to photograph might sparkle or display an outline or be color-coded in certain embodiments of the viewfinders for the shared image devices. An explicit monetary value indicator might also be associated with these valuable areas.

In certain embodiments, positional information such as those from global positioning system (GPS), metadata, or those including reference to some geographic location, particular individual, or setting can be used to indicate where certain pictures have been captured. For example, if outdoors, then GPS derived positional information can be used to indicate the physical location, and therefore information about the subject, of a particular photograph.

Consider that the viewfinder 900 display indicates that a large number of pictures have been captured of the same birthday cake, etc. In certain embodiments, this similar-composition shared image can be applied to devices lacking a sharing mechanism, as well as a shared image device 101. For example, if a particular user has captured a large number of images of one particular object, they would likely want to have an indication of it so that they can change the subject of further images. In another embodiment, perhaps a birds-eye view can be provided on at least some of the shared image devices to indicate where prior shared images in the sharing session have been captured. The recognition algorithm can vary widely in scope. For example, in one embodiment, positional information relating to where shared images have been captured could be indicated and searched, based on derived GPS coordinates or other positional information. In one embodiment, those shared images that the current shared image device (or any particular shared image device) has captured can be highlighted in some manner along the bottom, side, top, etc. of the viewfinder 900.

In certain embodiments, pictures can be sorted based on color schemes, or color map queries. An example might be considering the N shared images that appear most similar to the M shared images from a computational perspective. In those instances, images that have been stored in memory can be quickly accessed and returned to one or more of shared image devices. This type of design task due to view images chronologically or based on their value can be achieved using commercially available pattern recognition programs. Instead of viewing the shared images based on their time sequences, the images are sorted based at least partially on composition in certain embodiments of shared image devices. Image processing or signal processing techniques can be applied to the shared image devices to determine certain characteristics of the shared images.

As technology improves, more memory storing-capabilities will likely be provided to many individual shared image devices such as digital cameras, camcorders, printers, and other such capturing and peripheral devices. The cost of individual digital shared images will likely continue to decrease as the associated technology improves. The sharing or copying of a considerable number of shared images from one capturing shared image device to another will become more affordable, especially as memory storage cost drops.

Other types of shared image sorting, shared image querying, or shared image storing techniques may be provided by a computer after the shared images could have been obtained or retained from a digital camera, camcorder, or web site. However, this feature will also likely be useful for the sharing mechanism between multiple shared image devices.

Figure 11:
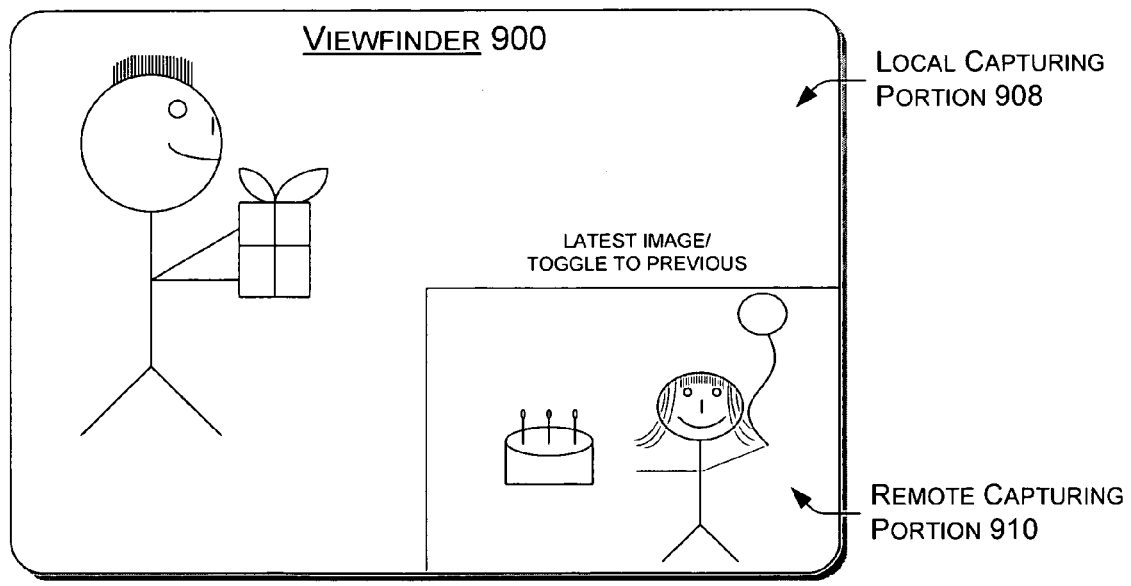
FIG. 11 shows a front view of one embodiment of the viewfinder as described with respect to FIG. 9.
Figure 12:
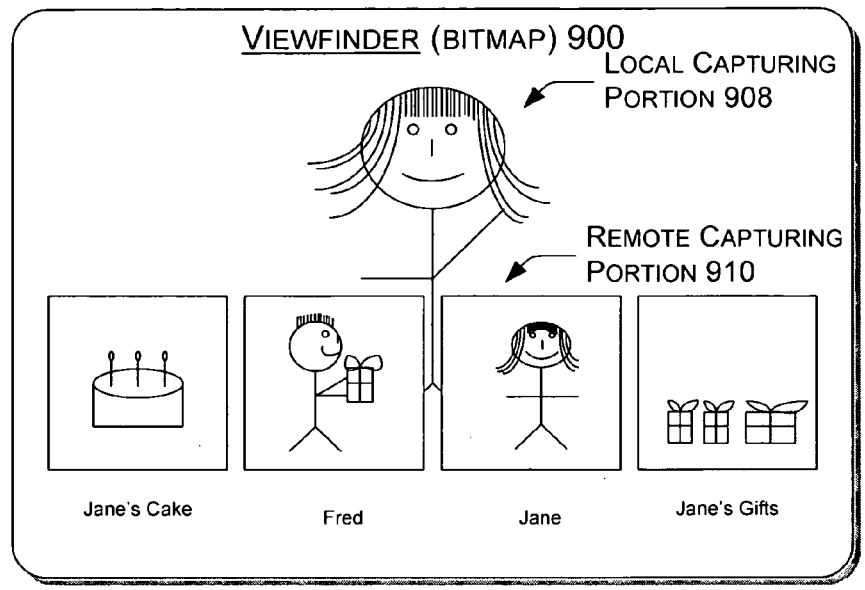
FIG. 12 shows a front view of another embodiment of the viewfinder as described with respect to FIG. 9.
Figure 13:
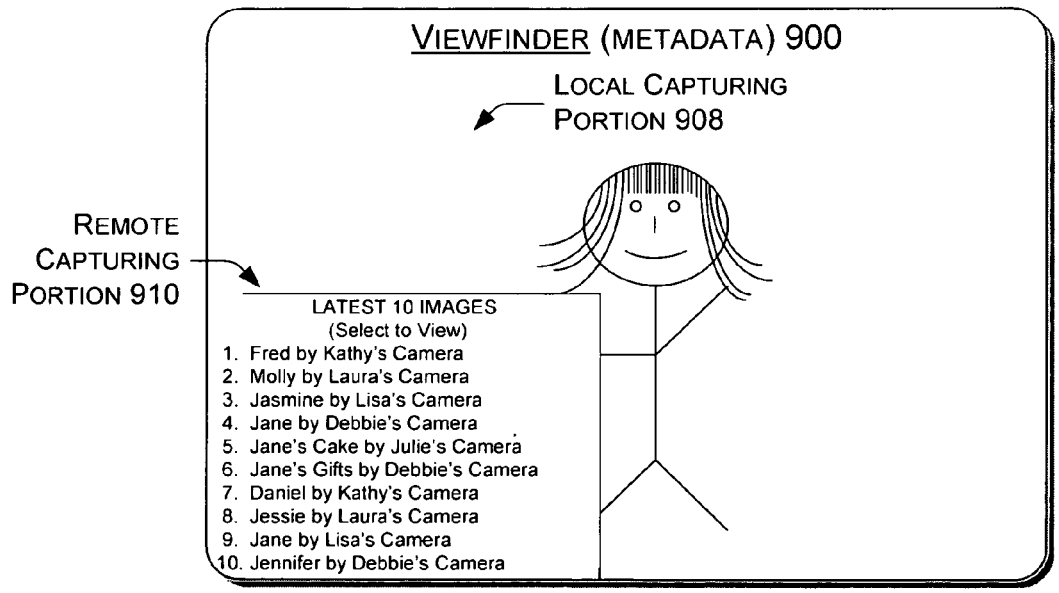
FIG. 13 shows a front view of yet another embodiment of the viewfinder as described with respect to FIG. 9.

In one embodiment, the most recently input information (e.g., one or few shared images) of the sessions shared image devices 101, such as digital cameras, can also be shown on the viewfinder 900 such as shown with respect to FIGS. 9 and 11. For example, display the last five or ten shared images captured in one embodiment. In another embodiment, thumbnails of the images as described with respect to FIG. 12 can be provided (e.g., the last four thumbnails that provide an image having a greatly reduced resolution and dimension from the original image). Alternatively, the metadata can be organized to indicate where the latest images by the shared image devices that have been participating in the session have been taken as described with respect to FIG. 13. These figures are intended to be illustrative in nature, not limiting in scope.

In certain above-described embodiments of the viewfinders 900 as described for example with respect to FIGS. 9, 11, 12, 13, 14, and 15, the remote capturing portion 910 can be inserted as a distinctive window or text that is layered above a separate local capturing portion 908. This viewfinder configuration enhances use of the local viewfinder while monitoring shared images that might have originated from remote devices.

Figure 14:
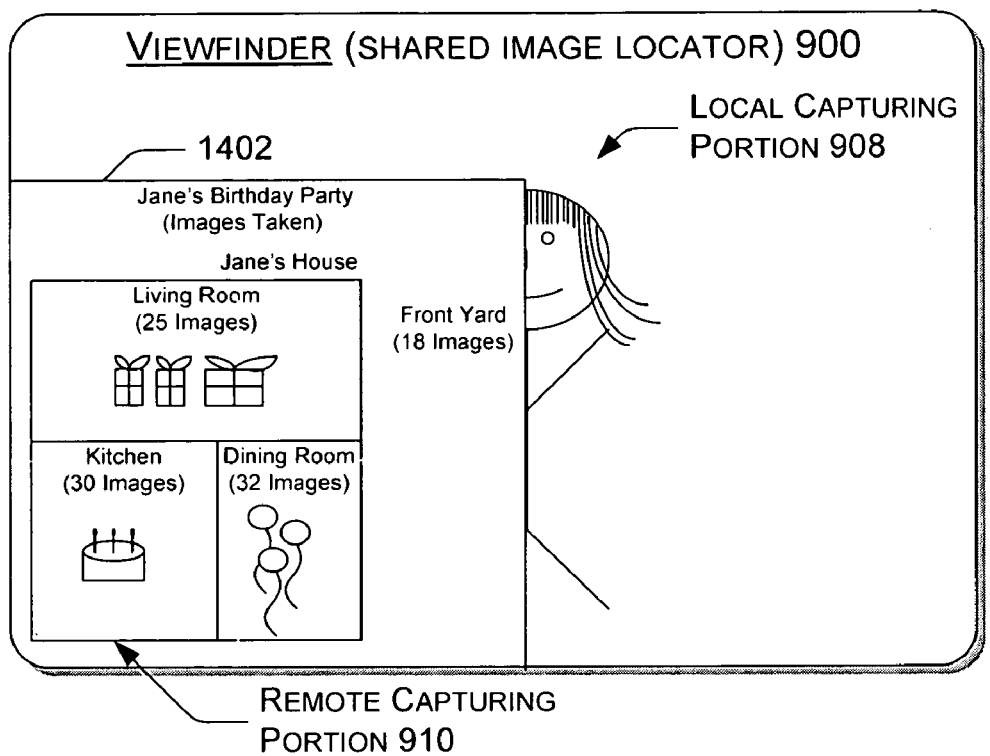
FIG. 14 shows a front view of still another embodiment of the viewfinder as described with respect to FIG. 9.
Figure 15:
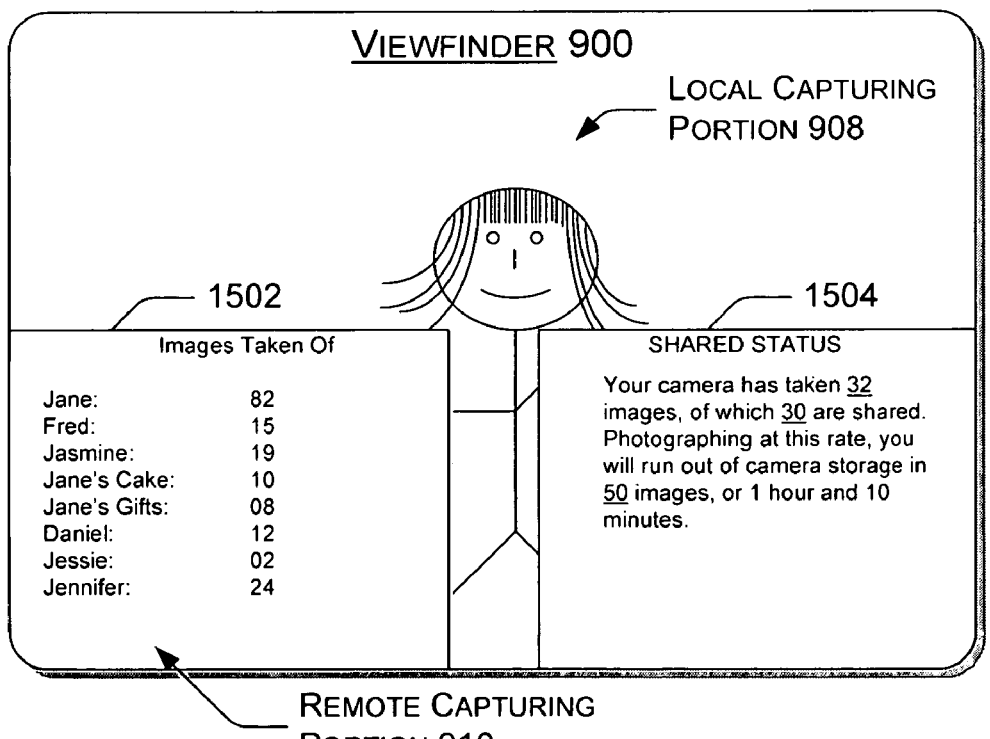
FIG. 15 shows a front view of yet another embodiment of the viewfinder as described with respect to FIG. 9.

A variety of viewfinder displays can be provided, such as illustrated in FIGS. 14 and 15. The embodiment of the viewfinder 900 as described with respect to FIG. 14 contains an inset portion 1402 that indicates how many images have been taken at a particular session in each of a variety of geographic locations. For example, the number of photographs taken in a living room, kitchen area, dining room, or outside is indicated. The number of images that have been captured can further be segmented according to the configuration of the particular shared image devices (e.g., the total captured images that have been captured in the living room include three from shared image device 1, five from shared image device 2, etc.). The geographic positioning of the shared images can further be displayed in any desired manner. Such description of the number of images taken within portions of houses can be indicated by a user inputting, for example, the general layout and positioning of the rooms within the house using, for example, software that the user can be used to draw the various rooms.

The user of each shared image device might thereupon be prompted as to the specific room, region, or other locational area in which a particular shared image can be captured. Alternately, additional positioning equipment such as a GPS unit can be installed in each shared image device, and the locations of the photographs can thereupon be applied to the particular rooms depending upon the derived GPS positions (e.g., as described by metadata).

Another embodiment of the viewfinder 900 is described with respect to the inset 1502 of FIG. 15, in which the viewfinder indicates the number of images taken of each subject within the session. Certain embodiments of the viewfinder 900 can indicate the number of images taken of each subject by each respective shared image device. The inset 1502 indicates, for example, that only two images have been captured of Jessie, and as such, she might be a prime candidate to be the subject of more images. Such indications of the number of images taken of each particular subject can be either manual (e.g., each user of a shared image device indicates the name of the subject for each image) or substantially automatic (e.g., the shared image device contains some recognition device that recognizes the identity of each subject for the shared images captured during the session, and thereby determines the identity of the subject for each image). There can be a number of different embodiments or versions of recognition software that can be utilized in different embodiments of the shared image devices, as described within this disclosure.

Certain embodiments of a status insert 1504, as included in the viewfinder 900 as described with respect to FIG. 15, can indicate the percentage of the resources for the shared image device that have been utilized. The used resources as indicated in the status insert 1504 can include, for example, the number of images taken, the number of images remaining, the percentage of storage memory remaining, the amount of battery life remaining, etc. Certain embodiments of the viewfinder as described with respect to FIG. 15 are configured to obtain or retain shared images. The rate of obtaining or retaining by that shared image device as well as the memory storage size of that shared image device largely determines how much time will remain until some prescribed duration is reached for capturing shared images.

As such, metadata can be associated with a particular shared image. For example, metadata can indicate a camera in a sharing session that took the shared image, the owner of the camera that took the shared image, the geographic location that the shared image was captured, the identity of an individual being imaged, subject of the shared image, the identity of the particular sharing session, etc.

Figure 16:
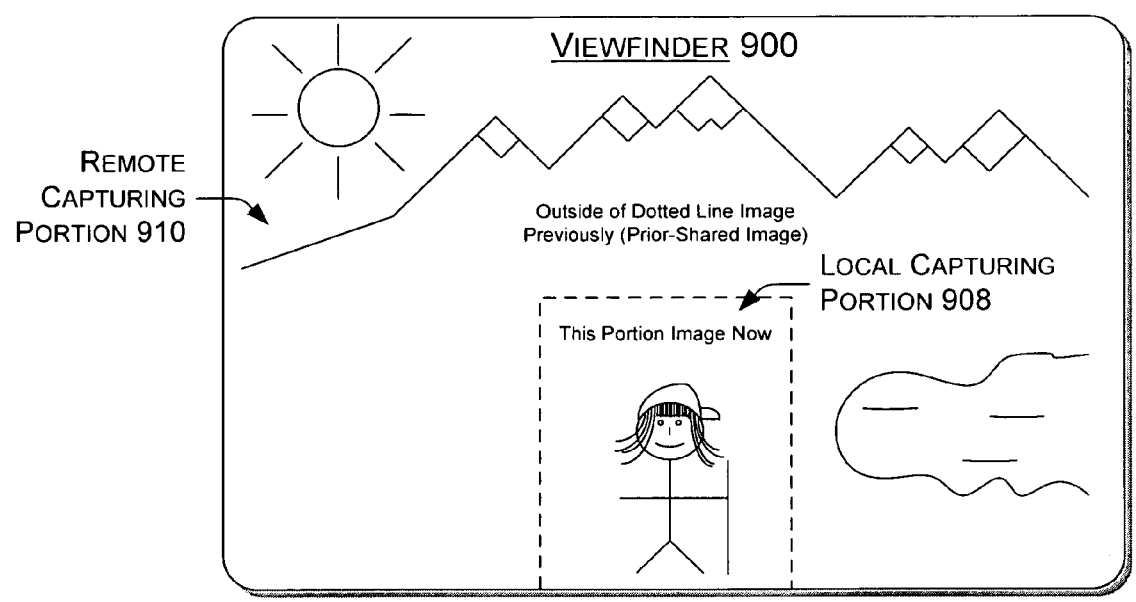
FIG. 16 shows a front view of yet another embodiment of the viewfinder where an image that is being currently captured is being integrated into a number of previously taken images.

Another embodiment of the viewfinder 900 displays the local capturing portion 908 within the remote capturing portion 910 as described with respect to FIG. 16. These embodiments of viewfinders can be used to provide a combined image in which one portion of the combined image (e.g., captured by a local shared image device) can be integrated into a larger image (e.g., captured by a remote shared image device).

In one embodiment, the local shared image device can be provided with a panoramic vision. The panoramic view formed partially by including other shared images can be configured to appear in the viewfinder 900 as a ghosted feature as displayed in FIG. 16. For example, the area outside of the dotted lines in FIG. 16 might represent those images taken previously, such as a picture of Mt. Rushmore, Yosemite, portions of New York, etc., often on a sunny day. The currently-imaged portion that is shown within the dotted lines can include the local capturing portion 908, which in many cases includes the immediate subject (e.g., wife, family, etc.). It is to be understood that certain embodiments of the shared image devices may not only share substantially-simultaneously captured images, but they may also share multiple images that have been captured at different times, different days, and even at different locations compared to when one or more portions of the images have been taken.

A variety of graphical user interface (GUI) techniques can be applied where the local capturing portion 908 is integrated within the remote capturing portion 910, as described with respect to FIG. 16. Such varying techniques of overlaying GUI windows, for example, are familiar to many users and designers of windows-based operating systems such as UNIX or Windows.

It might be interesting, for example, to combine multiple ones of these shared images using a similar ghosted feature to provide a single shared image. Similarly, embodiment involves providing a three-dimensional shared image using multiple photographs (e.g., two, three, or more) of the same shared object from different angles. A variety of imaging applications, such as providing an aircraft simulator, may be accomplished in which a variety of shared images are overlaying other shared images, at which certain of the overlaying shared images can include motion images to our present, for example, motion of instruments associated with such simulators.

From a broad aspect, such overlaying of static and/or motion images as associated with many embodiments of a share mechanism described within this disclosure relative to some description of where to place a particular shared room image device to achieve some multi-image effect with other shared image devices utilizing windowing or similar GUI techniques. Some software can be utilized to achieve the panoramic/3-dimensional/or other effects as desired. Certain embodiments of viewfinders for shared image devices involves using other people's shared image devices such as cameras, to insert old bookmarks at locations in where their cameras could have been located.

One viewfinder 900 embodiment involves using other people's shared image devices such as cameras, and put old bookmarks at locations in where their cameras could have been located.

In yet another embodiment, the viewfinder 900 of the shared image device can be provided with an indicator that provides positional information as to where the images have been taken. Such positional information can range from, but not be limited to, metadata that contains the latitude/longitude, GPS waypoint, within a known commercial location (e.g., at Sears®), at some residential location (within the living room at the Jones'), etc.

Examples of Device Capacity

A shared image device, operating as described in this disclosure, could reasonably be expected to capture, photograph, obtain, retain, or download a number of shared images. As such, it would be desired in certain embodiments to provide a relatively large memory storage area that can be utilized by each shared image device.

This section describes certain embodiments of indicators that allow the shared image device to operate within their capacity. When the capacity is reached, a particular shared image device typically does not operate as intended or designed. Different embodiments of capacity include, but are not limited to, memory storage capacity and/or battery life capacity. One example of a device capacity indicator has been described above with the status insert 1504 with respect to FIG. 15.

In many embodiments, the users of each shared image device can be provided with the option of obtaining or retaining particular shared images obtained from a particular shared image device, associated with a particular user, or relating to a particular subject. In one embodiment, such filtering techniques can filter based upon the metadata that is associated with each shared image.

In one embodiment, the shared image device 101 includes a record that indicates the shared image device that actually captured the shared images. In certain embodiments, the record also includes the identities of other shared image devices with which the user has agreed, by joining the sharing session, to be willing to share images. The user of the shared image device with such a record can select those other shared image devices with which they wish to access certain, or at least some of their, shared images for the particular sharing session. In one embodiment, this can be considered as a back-end synchronization, and the data can eventually make its way back to the capturing shared image device.

This can be because there is an association between the different shared image devices (e.g., a user's camera and the user's computer or printer). In one embodiment, there can be a sharing session identifier that is available to the members of the sharing session by which the shared images, portions thereof, associated information, metadata, etc. go through the net. In one embodiment, this data might in actuality be associated with the shared image, which is capable of becoming shared with other people at the sharing session.

The synchronization for a session of multiple shared image devices can allow a member shared image device that has left a session to return to the session. In addition, a member that has entered a session later than other members can receive the prior images relating to the session by synchronizing with other members of the session that have the prior shared images. In certain embodiments, it is envisioned that different members of the same session can have different sessions, so to provide a complete synchronization for a member joining (or rejoining) an existing session, the joining shared image device may obtain a number of images from multiple shared image device sources. In the master-satellite embodiments as described with respect to FIGS. 1 and 3, it may be possible for a member shared image device joining the session to synchronize therewith to obtain the images (or portions thereof) from that master shared image device which contains all images pertaining to that session.

Synchronization may be more complex in certain embodiments than certain shared image devices providing the images to other shared image devices. For example, certain shared image devices may have limited resources compared with other shared image devices due to different memory dimensions, different battery lives, different imaging resolutions, etc. As such, to transmit image data between different shared image devices, it may be important that the sending shared image device configure the image data in a format as desired by the receiving shared image device (e.g., thumbnail images, full images, portion of images, metadata relating to images, etc.).

In many embodiments of shared image devices, a mechanism could be provided such that a receiving shared image device that has obtained one version of a shared image can obtain another. For example, if a receiving shared image device that has already received a thumbnail shared image from a transmitting shared image device thereupon provides a request to obtain a full-resolution image version or a reduced-resolution image version of certain shared images, then the transmitting shared image device could be able to provide such images. In certain embodiments, such synchronization to provide certain versions of many images, or alternate versions of certain images, could be allowed even after the session is complete (e.g., using such a transfer mechanism as email or even some reestablished communication link).

In certain embodiments, a memory capacity warning such as the status indicator 1504 exists on capturing shared image devices such as a camera or camcorder. This memory capacity warning can function in a similar manner to a battery indicator, to indicate an amount of time remaining considering past-flows for the particular sharing session. As such, if the past image storage has taken up a prescribed percentage of the memory storage, the indicator will indicate the number of images used compared to those remaining, the percentage of image storage space used, or the amount of time remaining. The user of the shared image devices can use such indicators based on past-flows to judiciously apply further image capturing, obtaining, retaining, or other activities.

Certain ones of the device capacities may be related. For example, one capturing shared image device may be configured to only be able to store a certain number of shared full-sized images. The status insert 1504 therefore may indicate the number of remaining full-sized images, reduced-resolution images, as well as the number of thumbnail images or metadata. To obtain or retain more full-sized images or even reduced-resolution images may require a considerable amount of battery life that represents another embodiment of device capacity. And such, for a particular user to consider obtaining or retaining more images may depend partially on the battery life state as well as the current state of stored full-sized images, thumbnail images, or metadata.

In one embodiment, the data associated with the captured shared images can be initially stored in an image storage location within the shared image device. The percentage of data (or number of images) that is stored in the image storage location can be monitored, and when the percentage of data (or number of images) exceeds a predetermined amount, some data that is to be stored and/or data that has been stored can be obtained or retained to a remote storage location.

In one embodiment, the remote storage location can be remotely located from the device image storage location such that the image, or portions thereof, can be obtained or retained over a wireless communication link and/or other link such as over the Internet or another shared image network or network. In another embodiment, the remote storage location can include, for example, an image storage device that is operationally coupled, such as by a short connection link, to the shared image device. The physical memory dimensions of the image storage location, and as well as the remote storage location, can be selected based on the volumes and type of images, portions of images, or other image information that is likely to be obtained with a particular shared image device for a particular sharing session. As such, this allows the sharing by shared image devices 101 to be accomplished in a substantially-real time basis.

A data storage capacity situation can occur when a user overuses the storage capability of shared image device, such as by capturing too many images using a digital camera or camcorder. This may be connected to the shared-percentage concept described presenting, wherein if a certain percentage of the image capacity in a camera has been captured, either the images relating to that sharing session, or the images from a particular user, can be rejected (or selectively considered by using, e.g., a browsing mechanism).

Certain embodiments of the sharing mechanism can also operate as a subscription mechanism. For example, if a user of a first shared image device captures an image, it may be sent to the other shared image devices that are participating in the sharing session. Such a subscription to a sharing session may be equated with subscribing with another service. Each subscribing shared image device may thereupon elect to join a particular session. In certain embodiments of a session, each user of a shared image device can select which images are to be obtained or retained, and can reject certain images. There are a variety of embodiments that can be provided between sessions and subscriptions thereto.

In certain embodiments, if a user of a first shared image device agrees to publish a particular image for a number of other shared image devices including, in particular, a second shared image device, then the user at the second shared image device can, in certain embodiments but not others, agree to accept the pictures. It is also possible to envision relatively simple or complex cases. For example, shared image devices configured as digital cameras can have the capability of browsing through their shared images. Such a browser could be applied to incoming subscribed-to images. Consider an instance of a "stop subscribing" to those from these users, from this sharing session, and the like. As such, the images can be either permanently blocked, temporarily blocked, allowed access to add further time, selectively cultured, or a wide variety of other permutations. At a live event, a user may be more concerned with capturing the images than managing them.

Examples of Variable Resolution

Different embodiments of the shared image devices can provide images with different resolutions. In fact, certain shared image devices can alter the resolution of their images. Certain embodiments of shared image devices can increase the number of images that can be shared or imaged by adjusting the resolution of one or more of the images. In certain embodiments of shared image devices, the entirety of, portions of, or information relating to, the images captured during a sharing session can be viewed on the viewfinder of the shared image device. Conceivably, the ones that a user has captured, or that satisfy some other criteria, will be accepted at the highest resolution. Varying the image resolution therefore partially pertains to the capacity of the shared image device, as described above. Other images will be accepted at low resolutions. In certain embodiments, the lower resolution images can be kept, rejected, or selected having a corresponding higher resolution image obtained or retained in the future.

Commercially available technology can provide always-on video, for certain embodiments of shared image devices. Such always-on technology can likely be applied to shared image devices. As such, actuating the sharing mechanism may be one technique for determining interest of a particular shared image, wherein another user of a shared image device can provide feedback via audio as to how a shared image can be altered (e.g., modify the subject, vary the resolution or zoom of the image, etc.). If the current image appears interesting, one user of a shared image device can turn on an audio microphone to communicate with another shared image device, and either capture a current image and/or a current sound. Additionally, if there is one image of particular interest, it may be desirable to obtain or retain five images chronologically on either side of that image that had been taken by that particular shared image device.

Consider a shared image device application such as a friend providing live pictures of a ski resort, a beach area, and/or a snowy pass that have been captured using a share mechanism, wherein the current weather conditions make a difference. The sharing mechanism 102 can be used to access such information on a near-real-time basis. The images that can be accessed on a near-real-time basis may have reduced highest resolution. As such, it may be desirable to reduce the resolution for certain imaging applications.

The variable resolution control represents another embodiment of a capacity-control device. Consider that lower-resolution images (e.g., thumbnails and/or metadata) generally require less memory storage than higher-resolution images. As such, for a given memory, a larger number of lower-resolution images can be stored than higher-resolution images. In addition, capturing higher-resolution images often utilizes more battery life than with lower-resolution images. All of these factor into the type of image that is to be stored.

Further consider those instances where a user of a shared image device has filled their device with high-resolution images. This user will be able to utilize capacity control by storing further images as thumbnails and/or metadata that in certain embodiments can be accessed later when the user obtains or retains their current image, or otherwise obtains more memory. In certain embodiments, the user will be able to access the high-resolution versions of all of the desired images from home, or some other location, via a network.

Naming Aspects

Other embodiments of shared image devices 101 involve "naming". A unique name for a particular session can be associated with each of the shared image devices that captured at least one shared image such as a digital camera or camcorder. Another simpler sharing embodiment involves shared image devices 101 that are pre-configured when being built or distributed. For example, multiple cameras can be associated with each other such that at least some of those cameras will be able to share and/or copy images. For example, the metadata contained in the embodiment of the local capturing portion 908, as described with respect to FIG. 13, indicates whose camera captured the image as well as the subject of each captured shared image. In another embodiment, multiple cameras may not even require an express actuation of the sharing mechanism 102, but the sharing mechanism can be actuated by turning on at least some of the cameras concurrently. In another embodiment, the owner of the entire set of shared image devices 101 can be, for example, people getting married or the parents of the birthday party child.

In one embodiment, the shared image device 101 identifies where a particular shared image was captured or imaged, the subject of the particular shared image, and/or when the shared image was captured. In one embodiment, these types of shared image information can be contained as metadata relative to the shared image device 101. As such, the metadata can be used to answer queries that may be applied to the shared images in the sharing session.

Naming allows a shared image device 101 to be identified to its owner, or with its user. In one embodiment, a name stored as metadata or other information can include a filename and a timestamp, and an identification of the individual shared image device (e.g., the identity name can be added as the filename). The metadata can therefore be provided within the desired format on the shared images.

Certain new embodiments involve providing multiple shared image devices 101 at a given session being provided with a synchronized timestamp. As such, the shared images that pertain to a particular event such as a wedding can be sorted depending upon the chronology of when they occurred. For example, shared images that are associated with a wedding can be chronologically categorized and separated as shared images that occurred prior to the wedding, during the wedding, after the wedding, during the reception, or at the bar afterwards, etc. This therefore can allow the sharing mechanism to provide an offset time, for the distinct shared image devices 101. This can act similarly to synchronizing watches between multiple photographers, and indicating the time of each photograph that can be arranged sequentially.

Examples of the Computer/Controller

Figure 10:
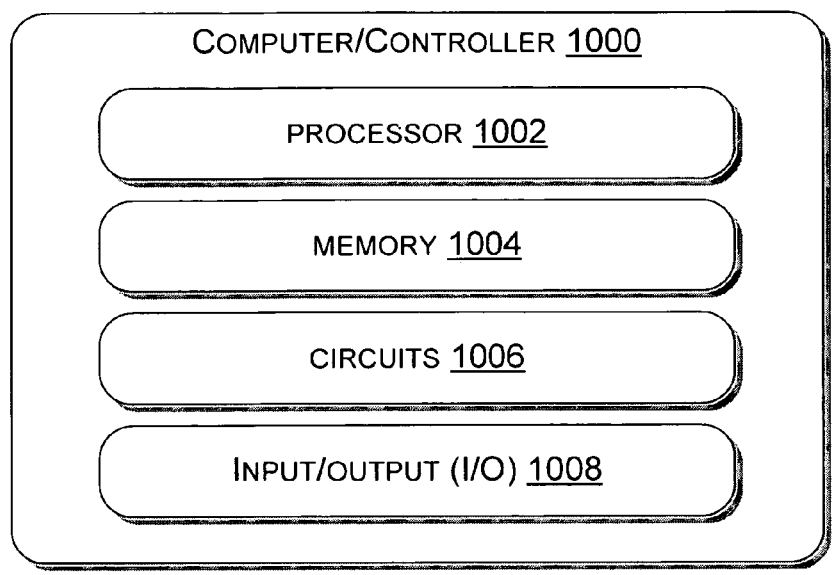
FIG. 10 shows a schematic diagram of one embodiment of a computer/controller that may be used as a portion of a sharing mechanism.

FIG. 10 shows one embodiment of computer/controller 1000 that can be included in certain embodiments of the shared image device to assist in providing the sharing. One embodiment of the computer/controller 1000 includes a central processing unit (CPU) 1002, a memory 1004, a circuit portion 1006, and an input output interface (I/O) 1008 that may include a bus (not shown). Different embodiments of the computer/controller 1000 can be a general-purpose computer, a microprocessor, a microcontroller, and/or any other known suitable type of computer or controller that can be implemented in hardware, software, electromechanical devices, and/or firmware. Certain portions of the computer/controller 1000 can be physically or operationally configured in each shared image device as described with respect to FIGS. 1 to 3. In one embodiment, the CPU 1002 performs the processing and arithmetic operations for the computer/controller 1000. The computer/controller 1000 controls the signal processing, database querying and response, computational, timing, data transfer, and other processes associated with the shared image device.

Certain embodiments of the memory 1004 include random access memory (RAM) and read only memory (ROM) that together store the computer programs, operands, and other parameters that control the operation of the shared image device. The bus provides for digital information transmissions between CPU 1002, circuit portion 1006, memory 1004, and I/O 1008. The bus also connects I/O 1008 to the portions of the shared image devices that either receive digital information from, or transmit digital information to other portions of the communication system 100.

I/O 1008 provides an interface to control the transmissions of digital information between each of the components in the computer/controller 1000. The I/O 1008 also provides an interface between the components of the computer/controller 1000 and different portions of the shared image device. The circuit portion 1006 can include such other user interface devices as a, display and/or a keyboard.

In another embodiment, the computer/controller 1000 can be constructed as a specific-purpose computer such as an application-specific integrated circuit (ASIC), a microprocessor, a microcomputer, or other similar devices. A distinct computer/controller 1000 can be integrated into certain embodiments of the shared image device 101, the share mechanism 102, and/or the communication link 104, as described with respect to FIG. 1 or 3.

CONCLUSION

This disclosure provides a number of embodiments of the sharing mechanisms that can allow images that are located on one device to be transferred to another device. Different embodiments of the sharing mechanisms can be included in such embodiments of the communication system 100 as telecommunication systems, computer systems, audio systems, video systems, teleconferencing systems, and/or hybrid combinations of certain ones of these systems. The embodiments of the shared image devices as described with respect to this disclosure are intended to be illustrative in nature, and are not limiting its scope.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for mainly a hardware and/or firmware vehicle; alternatively, if flexibility is paramount, the implementer may opt for mainly a software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", "operably linked", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

It is to be understood by those skilled in the art that, in general, the terms used in the disclosure, including the drawings and the appended claims (and especially as used in the bodies of the appended claims), are generally intended as "open" terms. For example, the term "including" should be interpreted as "including but not limited to"; the term "having" should be interpreted as "having at least"; and the term "includes" should be interpreted as "includes, but is not limited to"; etc. In this disclosure and the appended claims, the terms "a", "the", and "at least one" located prior to one or more items are intended to apply inclusively to either one or a plurality of those items.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that could have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that could have A alone, B alone, C alone, A and B together, A and C together, B and C together, and/or A, B, and C together, etc.).

Those skilled in the art will appreciate that the herein-described specific exemplary processes and/or devices and/or technologies are representative of more general processes and/or devices and/or technologies taught elsewhere herein, such as in the claims filed herewith and/or elsewhere in the present application.

Within this disclosure, elements that perform similar functions in a similar way in different embodiments may be provided with the same or similar numerical reference characters in the figures.

The invention claimed is:

1. A method comprising:
receiving information regarding a recognition of at least a portion of a subject being displayed in a viewfinder of an image capture device during a current portion of a session, the recognition of at least the portion of the subject being displayed in the viewfinder of the image capture device via at least in part a microprocessor;
determining information, via at least in part a microprocessor, as to how many images of at least a portion of the subject were captured during a portion of the session previous to the current portion of the session; and
generating instructions regarding displaying an indication in the viewfinder of the image capture device based at least upon the determining information as to how many images of at least a portion of the subject were captured during a portion of the session previous to the current portion of the session.

2. The method of claim 1, wherein the receiving information regarding a recognition of at least a portion of a subject being displayed in a viewfinder of an image capture device during a current portion of a session, the recognition of at least the portion of the subject being displayed in the viewfinder of the image capture device via at least in part a microprocessor comprises:
receiving information regarding a recognition of at least a portion of a subject being displayed in a viewfinder of an image capture device during a current portion of a session, the recognition of at least the portion of the subject being displayed in the viewfinder of the image capture device via at least in part an image recognition program executed by one or more microprocessors.

3. The method of claim 2, wherein the receiving information regarding a recognition of at least a portion of a subject being displayed in a viewfinder of an image capture device during a current portion of a session, the recognition of at least the portion of the subject being displayed in the viewfinder of the image capture device via at least in part an image recognition program executed by one or more microprocessors comprises:
receiving information regarding a recognition of at least a portion of a subject being displayed in a viewfinder of an image capture device during a current portion of a session, the recognition of at least the portion of the subject being displayed in the viewfinder of the image capture device via at least in part an image recognition program executed by one or more microprocessors during the current portion of the session.

4. The method of claim 1, wherein the determining information, via at least in part a microprocessor, as to how many images of at least a portion of the subject were captured during a portion of the session previous to the current portion of the session comprises:
determining information, via at least in part an image recognition program executed by one or more microprocessors, as to how many images of at least a portion of the subject were captured during a portion of the session previous to the current portion of the session.

5. The method of claim 4, wherein the determining information, via at least in part an image recognition program executed by one or more microprocessors, as to how many images of at least a portion of the subject were captured during a portion of the session previous to the current portion of the session comprises:
determining information, via at least in part an image recognition program executed by one or more microprocessors during the current portion of the session, as to how many images of at least a portion of the subject were captured during a portion of the session previous to the current portion of the session.

6. The method of claim 1, wherein the determining information, via at least in part a microprocessor, as to how many images of at least a portion of the subject were captured during a portion of the session previous to the current portion of the session comprises:
determining information, via at least in part one or more microprocessors, as to how many images of at least a portion of the subject captured during a portion of the session previous to the current portion of the session appear similar to the at least a portion of a subject being displayed in a viewfinder of an image capture device during a current portion of a session.

7. The method of claim 1, wherein the generating instructions regarding displaying an indication in the viewfinder of the image capture device based at least upon the determining information as to how many images of at least a portion of the subject were captured during a portion of the session previous to the current portion of the session comprises:
generating instructions regarding displaying an indication in the viewfinder of the image capture device of a portion of a subject being displayed in the viewfinder during the current portion of the session of which fewer images were captured during a portion of the session previous to the current portion of the session than were captured of a different portion of a subject being displayed in the viewfinder during the current portion of the session, based at least upon the determining information as to how many images of at least a portion of the subject were captured during a portion of the session previous to the current portion of the session.

8. The method of claim 1, wherein the receiving information and determining information occur during the current portion of the session.

9. The method of claim 1, wherein the at least a portion of a subject being displayed in a viewfinder during the current portion of the session is recognized in images captured during a portion of the session previous to the current portion of the session at least in part by an image recognition process executed by one or more microprocessors, the image recognition process operable during the current portion of the session.

* * * * *